(12) United States Patent
Narita

(10) Patent No.: US 10,224,055 B2
(45) Date of Patent: Mar. 5, 2019

(54) IMAGE PROCESSING APPARATUS, IMAGE PICKUP DEVICE, IMAGE PROCESSING METHOD, AND PROGRAM

(71) Applicant: Sony Semiconductor Solutions Corporation, Kanagawa (JP)

(72) Inventor: Tetsuya Narita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/545,146

(22) PCT Filed: Jan. 8, 2016

(86) PCT No.: PCT/JP2016/050429
§ 371 (c)(1),
(2) Date: Jul. 20, 2017

(87) PCT Pub. No.: WO2016/129303
PCT Pub. Date: Aug. 18, 2016

(65) Prior Publication Data
US 2018/0012618 A1 Jan. 11, 2018

(30) Foreign Application Priority Data
Feb. 10, 2015 (JP) ................. 2015-023764

(51) Int. Cl.
*H04N 5/932* (2006.01)
*H04N 5/935* (2006.01)
(Continued)

(52) U.S. Cl.
CPC .......... *G10L 21/055* (2013.01); *G11B 27/005* (2013.01); *G11B 27/10* (2013.01);
(Continued)

(58) Field of Classification Search
CPC .......... H04N 5/932; H04N 5/935; H04N 5/93; H04N 9/80; G11B 27/00
(Continued)

(56) References Cited

U.S. PATENT DOCUMENTS 8,116,608 B2 * 2/2012 Yamashita ........... G11B 27/005
348/231.4
2002/0080881 A1 * 6/2002 Honda ................. H04N 19/172
375/240.16
(Continued)

FOREIGN PATENT DOCUMENTS

JP 2007-267351 A 10/2007
JP 2010-178124 A 8/2010
(Continued)

*Primary Examiner* — Daquan Zhao
(74) *Attorney, Agent, or Firm* — Michael Best & Friedrich LLP

(57) ABSTRACT

An image pickup device which captures sound and a moving image prevents deterioration in a reproduction quality. A scene change detector detects a frame at the time of a scene change from among a plurality of frames imaged at a predetermined frame rate as a detection frame. A frame rate converting unit converts a frame rate of the frame imaged outside a detection to a lower frame rate. A video reproduction time setting unit sets a reproduction time when reproduction is performed at the lower frame rate as a video reproduction time. An audio reproduction time setting unit sets an audio reproduction time at constant intervals for sounds recorded at constant intervals outside the detection period and sets an audio reproduction time in synchronization with the video reproduction time corresponding to the detection frame relative to sound recorded in the detection period.

20 Claims, 20 Drawing Sheets

(51) Int. Cl.
   *G11B 27/00* (2006.01)
   *H04N 5/93* (2006.01)
   *G10L 21/055* (2013.01)
   *G11B 27/10* (2006.01)
   *H04N 5/14* (2006.01)
   *H04N 5/232* (2006.01)
   *H04N 5/77* (2006.01)
   *H04N 5/783* (2006.01)
   *H04N 9/802* (2006.01)
   *H04N 9/80* (2006.01)

(52) U.S. Cl.
   CPC ......... *H04N 5/147* (2013.01); *H04N 5/23232* (2013.01); *H04N 5/772* (2013.01); *H04N 5/783* (2013.01); *H04N 5/9305* (2013.01); *H04N 9/802* (2013.01)

(58) Field of Classification Search
   USPC .......................... 386/201, 285, 239, 248, 278
   See application file for complete search history.

(56) References Cited

U.S. PATENT DOCUMENTS

| | | | | |
|---|---|---|---|---|
| 2003/0194210 | A1* | 10/2003 | Shiiyama | G11B 27/005 386/344 |
| 2006/0140575 | A1* | 6/2006 | Fuchigami | G11B 27/034 386/248 |
| 2006/0239647 | A1* | 10/2006 | Mori | G11B 27/105 386/248 |
| 2008/0107400 | A1* | 5/2008 | Jung | H04N 5/85 386/278 |
| 2008/0252583 | A1* | 10/2008 | Sakashita | G09G 3/3614 345/90 |
| 2009/0116814 | A1* | 5/2009 | Morohashi | H04N 5/92 386/248 |
| 2009/0317067 | A1* | 12/2009 | Isobe | G11B 27/034 386/248 |
| 2010/0265344 | A1* | 10/2010 | Velarde | H04N 5/232 348/208.16 |

FOREIGN PATENT DOCUMENTS

| | | |
|---|---|---|
| JP | 2010-206641 A | 9/2010 |
| JP | 2011-055386 A | 3/2011 |
| JP | 2011-139306 A | 7/2011 |
| WO | 2006/082787 A1 | 8/2006 |

* cited by examiner

IMAGE PROCESSING APPARATUS, IMAGE PICKUP DEVICE, IMAGE PROCESSING METHOD, AND PROGRAM

TECHNICAL FIELD

The present technology relates to an image processing apparatus, an image pickup device, an image processing method, and a program. More specifically, the present technology relates to an image processing apparatus for performing recording and sound recording, an image pickup device, and an image processing method by using the above devices, and a program for causing a computer to execute the method.

BACKGROUND ART

Conventionally, when an object moving at high speed is imaged, an image pickup device that images a moving image at high speed and at a frame rate higher than a frame rate at the time of reproduction has been used. A smooth slow motion video can be obtained by reproducing the moving image at a frame rate lower than that at the time of recording. For example, when a moving image imaged at a high frame rate of 600 hertz (Hz) is reproduced at a low frame rate of 60 hertz (Hz), the reproduction time is extended to 10 times of a recording time, and a motion speed of the object in the reproduced moving image is reduced to 1/10. An image pickup device has been proposed which slows down the audio reproduction speed in accordance with a decrease in the frame rate in a case where sound is recorded during the high-speed shooting (for example, refer to Patent Document 1). For example, when the moving image is reproduced at a frame rate of 1/10 relative to that at the time of recording, the image pickup device slows the reproduction speed to 1/10 to reproduce the sound. Also, a reproduction time of the sound after the reproduction speed conversion is set to a start time of the high-speed shooting.

CITATION LIST

Patent Document

Patent Document 1: Japanese Patent Application Laid-Open No. 2010-178124

SUMMARY OF THE INVENTION

Problems to be Solved by the Invention

However, with the above-described conventional technique, when the sound reproduction speed gets slower, it may be difficult to listen to the sound because of deterioration in a sound reproduction quality. Also, in a case where the sound is reproduced from the start of the high-speed shooting without changing the sound reproduction speed, a silent time is prolonged. For example, when the reproduction time of the moving image imaged at high speed for one second is extended to 10 seconds and sound recorded at the time of high-speed shooting is reproduced from the start of the high-speed shooting without extending the sound, the silent time continues for nine seconds. As a result, the reproduction quality may be deteriorated. Thus, there is a problem that it is difficult to suppress the deterioration in the reproduction quality.

The present technology has been made in consideration of the above state. A purpose of the present technology is to suppress deterioration in a reproduction quality of an image pickup device for capturing sound and a moving image.

Solutions to Problems

The present technology has been made to solve the above-mentioned problems. A first aspect of the present technology is an image processing apparatus, an image processing method of the image processing apparatus, and a program for causing a computer to execute the method. The image processing apparatus includes a scene change detector which detects a frame at the time of a scene change from among a plurality of frames imaged at a predetermined frame rate as a detection frame, a frame rate converting unit which converts a frame rate of a frame imaged outside a detection period including an imaging time of the detection frame from among the plurality of frames to a low frame rate lower than the predetermined frame rate, a video reproduction time setting unit which sets a reproduction time when reproduction is performed at the low frame rate as a video reproduction time of each of the plurality of frames, and an audio reproduction time setting unit which sets an audio reproduction time at constant intervals to a plurality of sounds recorded at the constant intervals outside the detection period and sets an audio reproduction time in synchronization with the video reproduction time corresponding to the detection frame relative to the sound recorded in the detection period. With the above first aspect of the present technology, an effect is obtained that the audio reproduction time in synchronization with the video reproduction time corresponding to the detection frame is set relative to the sound recorded in the detection period.

Also, in the first aspect, the image processing apparatus may further include a reproduction speed changing unit that slows the reproduction speed of the sound recorded in the detection period. With the reproduction speed changing unit, an effect is obtained that the reproduction speed of the sound recorded in the detection period is changed.

Also, in the first aspect, it is possible that the image processing apparatus further includes a duplication unit which duplicates the data of the audio recorded in the detection period to generate duplicated data and the audio reproduction time setting unit sets an audio reproduction time of the duplicated data to the reproduction end time of the sound recorded in the detection period. With the above processing, an effect is obtained that the audio reproduction time of the duplicated data is set as the time synchronized with the reproduction end time of the sound recorded in the detection period.

Further, in the first aspect, the image processing apparatus may further include a manual setting unit which sets a fixed period as a manual setting period in accordance with an operation by a user. The frame rate converting unit is may convert a frame rate of a frame imaged in a period other than the detection period and the manual setting period to the low frame rate, and the audio reproduction time setting unit may set a specific time in the manual setting period as an audio reproduction time relative to sound recorded in the manual setting time. With the above configuration, an effect can be obtained that the specific time in the manual setting period is set as the audio reproduction time relative to the sound recorded in the manual setting period.

Further, in the first aspect, a sound superimposing unit may be further included for superimposing a predetermined additional sound on the sound. With the sound superimposing unit, an effect can be obtained that the additional sound is superimposed.

Also, a second aspect of the present technology is an image pickup device including an imaging unit which images a plurality of frame rates at a predetermined frame rate, a scene change detector which detects a frame at the time of a scene change from among the plurality of frames as a detection frame, a frame rate converting unit which converts a frame rate of a frame imaged outside a detection period including an imaging time of the detection frame from among the plurality of frames to a low frame rate lower than the predetermined frame rate, a video reproduction time setting unit which sets a reproduction time when reproduction is performed at the low frame rate as a video reproduction time of each of the plurality of frames, and an audio reproduction time setting unit which sets an audio reproduction time at constant intervals to a plurality of sounds recorded at the constant intervals outside the detection period and sets an audio reproduction time in synchronization with the video reproduction time corresponding to the detection frame relative to the sound recorded in the detection period. With the above first aspect of the present technology, an effect is obtained that the audio reproduction time in synchronization with the video reproduction time corresponding to the detection frame is set relative to the sound recorded in the detection period.

Effects of the Invention

According to the present technology, an excellent effect can be obtained that deterioration in a reproduction quality can be suppressed in an image pickup device for capturing sound and moving images. Note that the effects described herein are not limited, and the effect may be any effects described in the present disclosure.

MODE FOR CARRYING OUT THE INVENTION

Embodiments for carrying out the present technology (referred to as embodiment below) are described below. The description is made in the following order.

1. First embodiment (example in which reproduction time is set to scene change timing)
2. Second embodiment (example in which reproduction time is set to user specifying timing or scene change timing)
3. Third embodiment (example in which reproduction timing is set to scene change timing by changing reproduction speed)
4. Fourth embodiment (example in which reproduction time is set to scene change timing by duplicating audio data)
5. Fifth embodiment (example in which reproduction time is set to scene change timing by adding sound)

1. First Embodiment

[Exemplary Configuration of Image Pickup Device]

Figure 1:
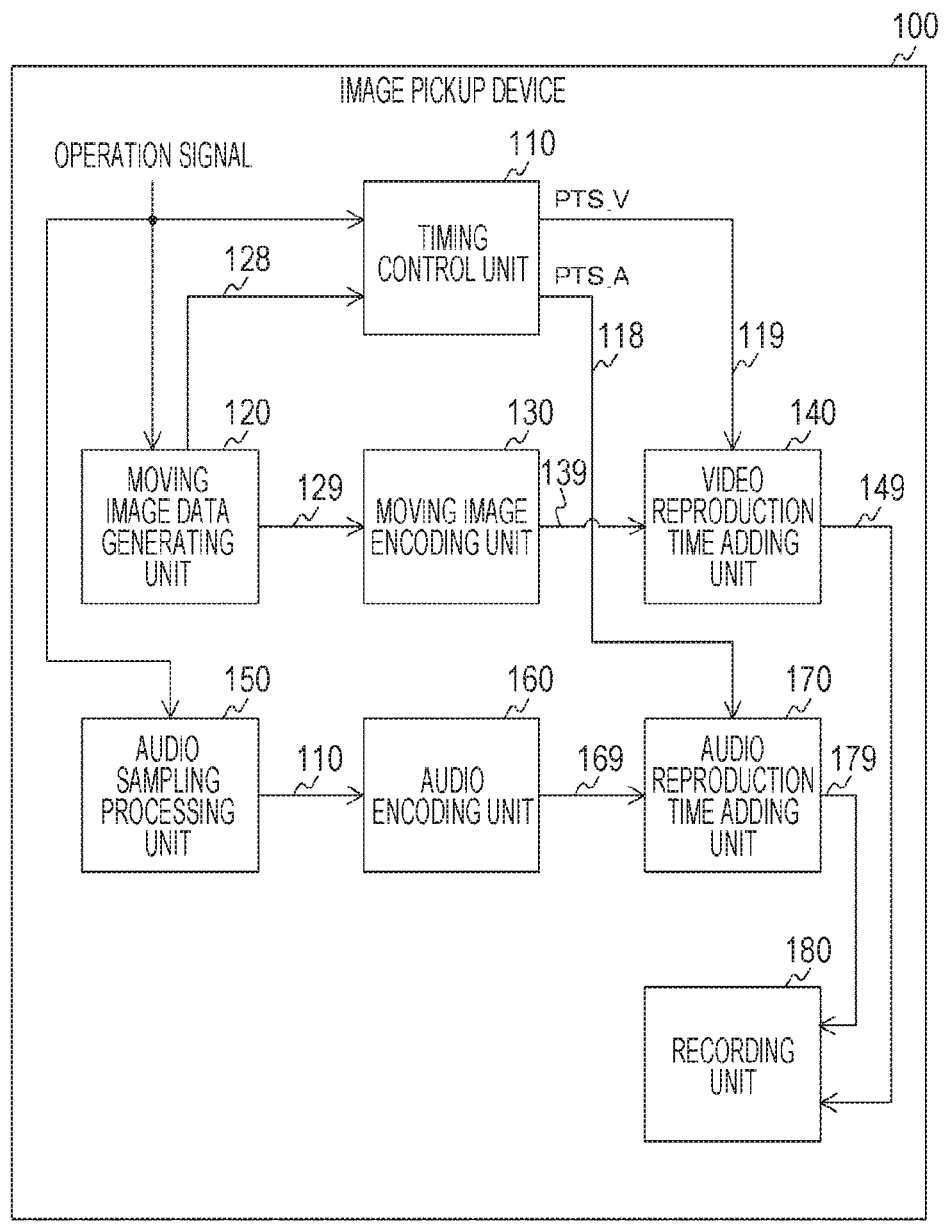
FIG. 1 is a block diagram of an exemplary configuration of an image pickup device according to a first embodiment.

FIG. 1 is a block diagram of an exemplary configuration of an image pickup device 100 according to a first embodiment. The image pickup device 100 includes a timing control unit 110, a moving image data generating unit 120, a moving image encoding unit 130, a video reproduction time adding unit 140, an audio sampling processing unit 150, an audio encoding unit 160, an audio reproduction time adding unit 170, and a recording unit 180.

The moving image data generating unit 120 generates moving image data including a plurality of video frames in time series according to an operation signal generated by an operation by a user. As an operation signal, for example, a signal indicating start timings of video recording and sound recording and a signal indicating end timings of the video recording and the sound recording are input. Here, it is assumed that the start timings of the video recording and the video recording be the same. Similarly, it is assumed that the end timings of the video recording and sound recording be the same. The moving image data generating unit 120 supplies the generated moving image data to the moving image encoding unit 130 via a signal line 129.

The moving image encoding unit 130 encodes the moving image data. The moving image data is encoded, for example, in compliance with a moving picture experts group (MPEG)-2 standard. The moving image encoding unit 130 packetizes the encoded moving image data into a video packet and supplies the data to the video reproduction time adding unit 140 via a signal line 139. Furthermore, the moving image encoding unit 130 may encode the moving image data in compliance with a standard other than the MPEG-2, such as an MPEG-4.

The audio sampling processing unit 150 samples sound according to the operation signal to generate sampling data.

For example, the sound is sampled at a sampling frequency of 44.1 kilohertz (kHz), and sampling data having a size (for example, 16 bits) according to the quantization bit depth is generated each time when sampling is performed. The audio sampling processing unit 150 supplies the sampling data to the audio encoding unit 160. Furthermore, the sampling frequency and the quantization bit depth are not respectively limited to 44.1 kilohertz (kHz) and 16 bits.

The audio encoding unit 160 encodes the sampling data by a predetermined encoding unit. The sampling data is encoded, for example, by a unit of 20 milliseconds (ms) in compliance with the MPEG standard. Each piece of the audio data encoded by the coding units is referred to as an "audio frame". The audio encoding unit 160 packetizes the audio frame into an audio packet and supplies the audio packet to the audio reproduction time adding unit 170 via a signal line 169.

The audio sampling processing unit 150 and the audio encoding unit 160 record sounds at constant intervals. Note that the audio sampling processing unit 150 and the audio encoding unit 160 are exemplary recording units in claims.

The timing control unit 110 sets a video reproduction time for each video frame and sets an audio reproduction time for each audio frame. For example, a presentation time stamp (PTS) in the MPEG standard is set as the reproduction time. In the following description, the PTS set to the video frame is referred to as a "PTS_V", and the PTS set to the audio frame is referred to as a "PTS_A". The timing control unit 110 supplies the PTS_V to the video reproduction time adding unit 140 via a signal line 119 and supplies the PTS_A to the audio reproduction time adding unit 170 via a signal line 118.

The video reproduction time adding unit 140 adds the PTS_V to the video packet as the video reproduction time. The video reproduction time adding unit 140 supplies the video packet to which the PTS_V has been added to the recording unit 180 via a signal line 149.

The audio reproduction time adding unit 170 adds the PTS_A to the audio packet as the audio reproduction time. The audio reproduction time adding unit 170 supplies the audio packet to which the PTS_A has been added to the recording unit 180 via a signal line 179.

The recording unit 180 records a stream including the video packet and the audio packet.

Furthermore, the image pickup device 100 may further include a decoding unit and may decode the stream. Also, the image pickup device 100 may further include a display unit and an audio reproduction unit in addition to the decoding unit, and may reproduce a moving image obtained by decoding together with the sound. Furthermore, the image pickup device 100 may further include an external interface, and may output the stream to an external device.

[Exemplary Configuration of Moving Image Data Generating Unit]

Figure 2:
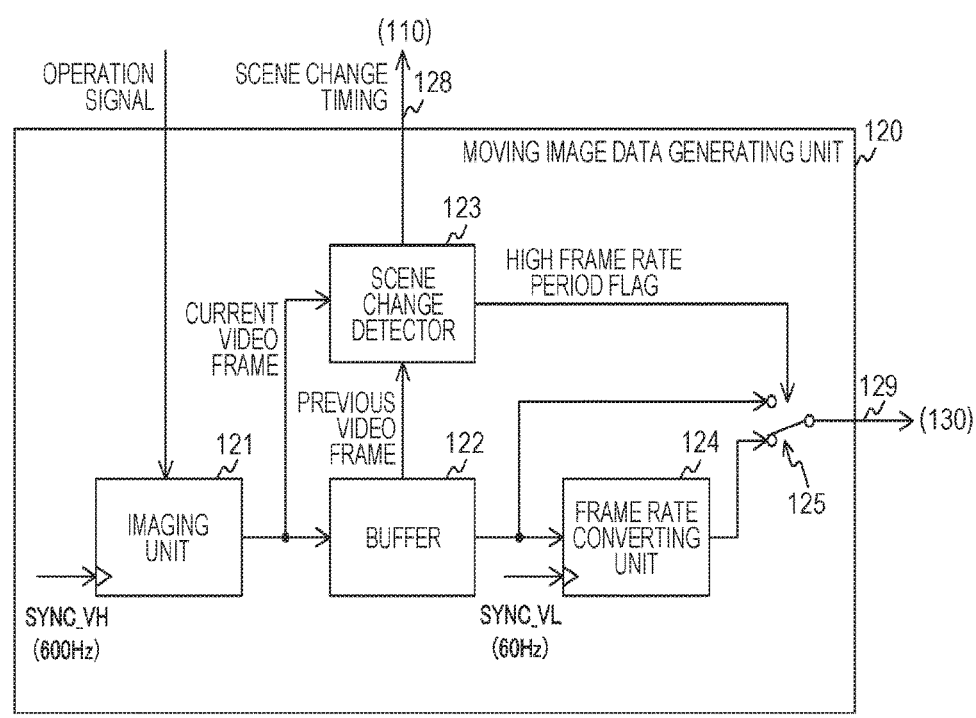
FIG. 2 is a block diagram of an exemplary configuration of a moving image data generating unit according to the first embodiment.

FIG. 2 is a block diagram of an exemplary configuration of the moving image data generating unit 120 according to the first embodiment. The moving image data generating unit 120 includes an imaging unit 121, a buffer 122, a scene change detector 123, a frame rate converting unit 124, and a switching unit 125.

The imaging unit 121 captures a plurality of video frames in time series in synchronization with a predetermined vertical synchronization signal SYNC_VH according to the operation signal. The imaging unit 121 includes, for example, an optical system such as an imaging lens and an imaging element. For example, a complementary metal oxide semiconductor (CMOS) sensor and a charge coupled device (CCD) sensor are used as the imaging element. Also, a frequency of the vertical synchronization signal SYNC_VH is a value higher than the frame rate at the time of the reproduction, for example, 600 hertz (Hz). The imaging unit 121 makes the buffer 122 hold each video frame and supplies the video frame to the scene change detector 123 as a current video frame. The buffer 122 holds a predetermined number of video frames.

The scene change detector 123 detects a video frame at the time of the change of the scene as a detection frame. The scene change detector 123 obtains a video frame before the current frame from the buffer 122 as a previous video frame, compares the current video frame with the previous video frame, and determines whether the scene changes on the basis of the comparison result. When the scene has been changed, the scene change detector 123 supplies the imaging time of the frame at that time to the timing control unit 110 as a scene change timing. Also, the scene change detector 123 sets a fixed period including the scene change timing to a high frame rate period and supplies a high frame rate flag indicating the high frame rate period to the switching unit 125. For example, a period of a predetermined time including the scene change timing at the center (one second and the like) is set as the high frame rate period. Also, for example, regarding the high frame rate period flag, a value of "one" is set in the high frame rate period, and a value of "zero" is set outside the high frame rate period.

The frame rate converting unit 124 reduces the frame rate by thinning out the frames held by the buffer 122. For example, the frame rate converting unit 124 converts the frame rate of the video frame to the frame rate of the frequency (for example, 60 hertz: Hz) of the vertical synchronization signal SYNC_VL and supplies the frame rate to the switching unit 125.

The switching unit 125 switches a frame to be output according to the high frame rate period flag. In a case where the high frame rate period flag is "one", the switching unit 125 supplies the video frame held by the buffer 122 to the moving image encoding unit 130. On the other hand, in a case where the high frame rate period flag is "zero", the switching unit 125 supplies the frame from the frame rate converting unit 124 to the moving image encoding unit 130.

Furthermore, although the imaging unit 121 and the audio sampling processing unit 150 are provided in a single device, the imaging unit 121 and the audio sampling processing unit 150 may be separately provided in different devices. For example, the imaging unit 121 and the audio sampling processing unit 150 may be provided in the image pickup device, and other circuits may be provided in the image processing apparatus.

[Exemplary Configuration of Timing Control Unit]

Figure 3:
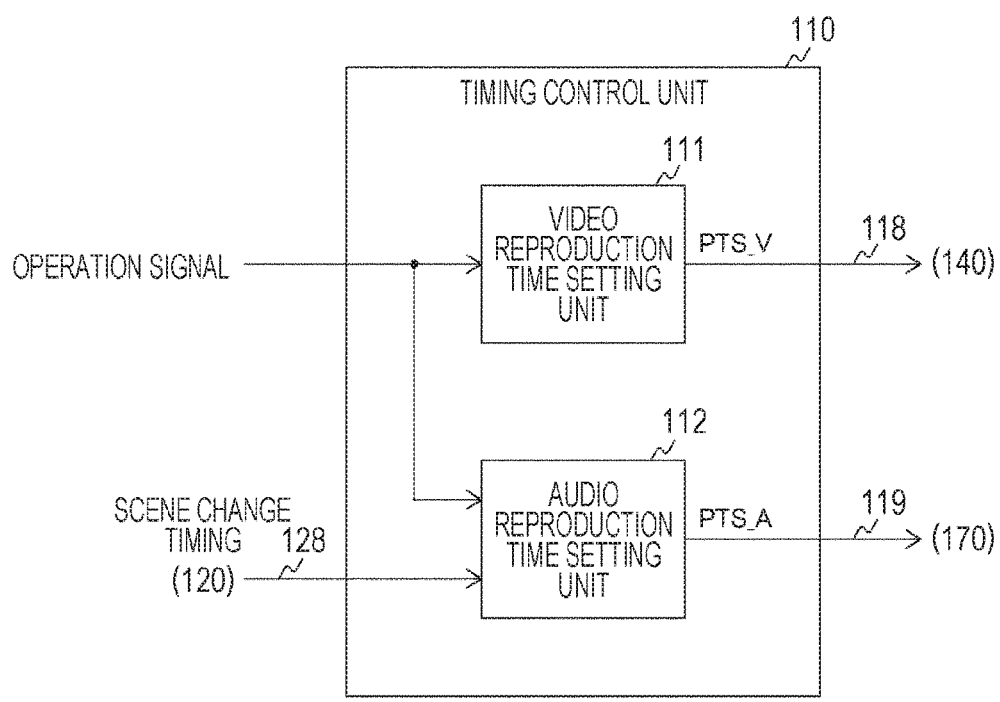
FIG. 3 is a block diagram of an exemplary configuration of a timing control unit according to the first embodiment.

FIG. 3 is a block diagram of an exemplary configuration of the timing control unit 110 according to the first embodiment. The timing control unit 110 includes a video reproduction time setting unit 111 and an audio reproduction time setting unit 112.

The video reproduction time setting unit 111 sets the video reproduction time (PTS_V) for each video frame. The video reproduction time setting unit 111 sets the PTS_V to reproduce the video frame in synchronization with the vertical synchronization signal SYNC_VL. As the PTS_V, for example, a value obtained by multiplying the number of seconds from a reference time to the reproduction time by a predetermined reference frequency is set. For example, in a case where the reference frequency is 90 kilohertz (kHz) and the reproduction is performed at a time of 0.5 seconds from the reference time, a value of 0.5×90×1000 is set as the PTS_V.

The audio reproduction time setting unit 112 sets the audio reproduction time (PTS_A) for each audio frame. The audio reproduction time setting unit 112 sets the PTS_A to perform the reproduction in synchronization with the vertical synchronizing signal SYNC_VL relative to the audio frame outside the high frame rate period. On the other hand, the audio reproduction time setting unit 112 sets the time synchronized with the scene change timing to the PTS_A relative to the audio frame in the high frame rate period. For example, the time same as the scene change timing and the time when the scene change timing is shifted by a certain time are set as the PTS_A as the synchronized time.

Figure 4:
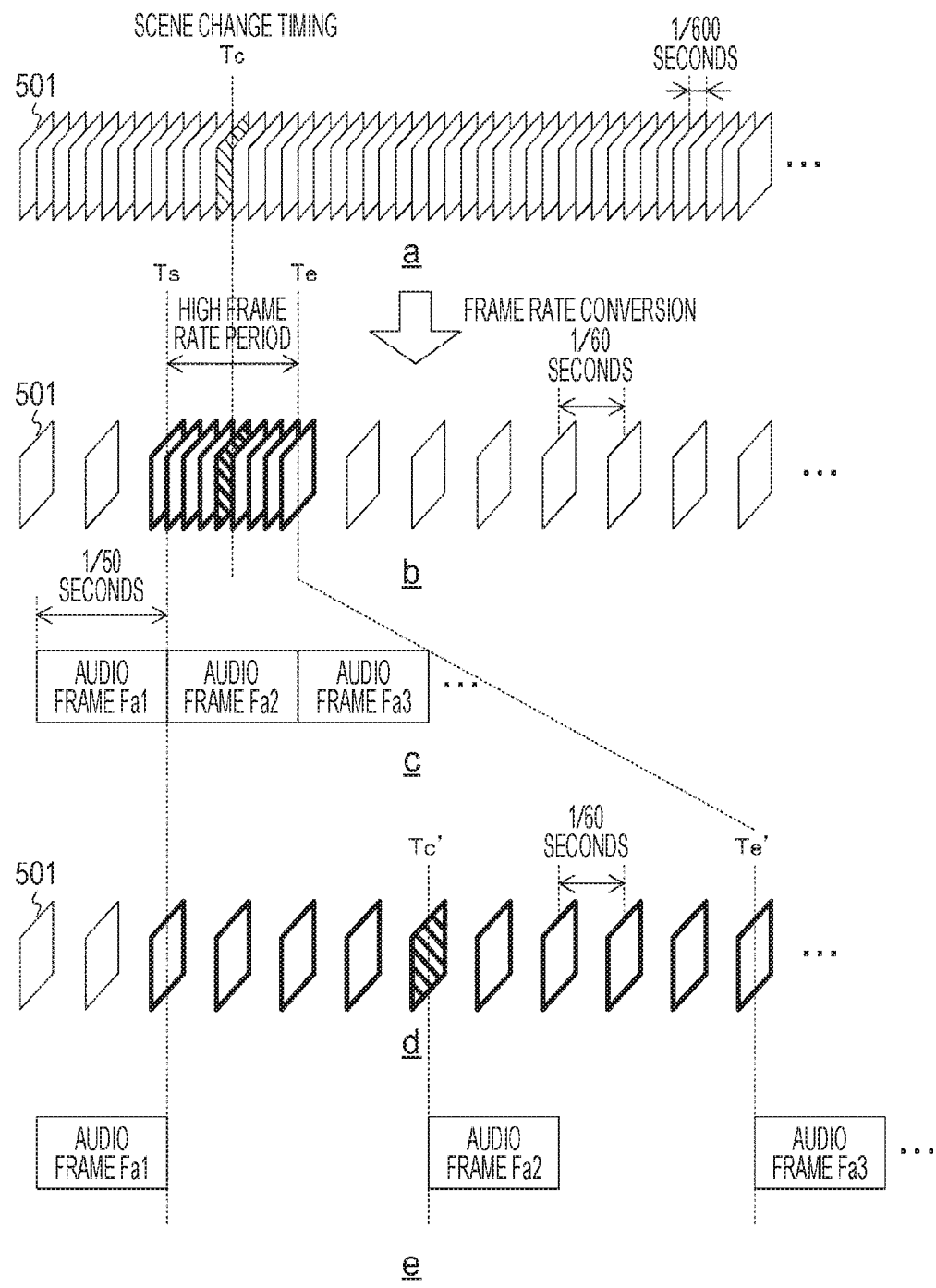
FIG. 4 is a diagram of an exemplary stream according to the first embodiment.

FIG. 4 is a diagram of an exemplary stream according to the first embodiment. a of FIG. 4 is a diagram of an exemplary video frame imaged in synchronization with the vertical synchronizing signal SYNC_VH. In a case where the frequency of the vertical synchronization signal SYNC_VH is 600 hertz (Hz), a plurality of video frames such as a video frame 501 is imaged in each 1/600 seconds. Also, from among the video frames, a video frame at the time of a scene change (Tc) is detected as a detection frame. In a of FIG. 4, a video frame painted out with diagonal lines indicates the detection frame.

b of FIG. 4 is a diagram of an exemplary frame after the frame rate has been converted. A fixed period including the scene change timing Tc is set to the high frame rate period, and the frame rate is converted to a low frame rate of, for example, 60 hertz (Hz) outside the high frame rate period. The video frames surrounded by the bold line in b of FIG. 4 indicate the video frames in the high frame rate period.

c of FIG. 4 is a diagram of an exemplary audio frame. For example, the sampling data is encoded for each 1/50 seconds, and frames such as audio frames Fa1, Fa2, and Fa3 are generated. Here, the audio frames Fa1 and Fa3 are recorded outside the high frame rate period, and the audio frame Fa2 is recorded in the high frame rate period.

d of FIG. 4 is a diagram of an exemplary video frame to which the video reproduction time has been set. For each video frame including the detection frame, the video reproduction time to perform the reproduction, for example, at a low frame rate of 60 hertz (Hz) is set. According to the video reproduction time, a moving object imaged in the high frame rate period is reproduced in a very slow motion. For example, in a case where the frame rate in the high frame rate period is 600 hertz (Hz) and the frame rate at the time of the reproduction is 60 hertz (Hz), the reproduction time is extended to 10 times of the high frame rate period, the motion speed of the moving object is reduced to 1/10.

e of FIG. 4 is a diagram of an exemplary audio frame to which the audio reproduction time has been set. The audio reproduction time is set at constant intervals (for example, 1/50 seconds) relative to the audio frames Fa1, Fa3 and the like outside the high frame rate period. On the other hand, relative to the audio frame Fa2 in the high frame rate period, a video reproduction time Tc' corresponding to the detection frame is set.

Strictly, the reproduction time of the audio frame Fa2 recorded in the high frame rate period is a start time point Ts of the high frame rate period. However, if the start time point Ts is set as the audio reproduction time, silent time is prolonged. For example, in a case where the high frame rate period is one second and the reproduction time is extended to 10 times (that is, 10 seconds), the silent time continues for nine seconds. Although it is considered to slow down the sound reproduction speed as in Patent Document 1, it becomes harder to catch the sounds as the reproduction speed gets slower.

Whereas, the image pickup device 100 sets a video reproduction time Tc' corresponding to the detection frame to the audio reproduction time with respect to the audio frame Fa2 in the high frame rate period. Therefore, silent time is shortened. For example, in a case where the high frame rate period is 0.5 seconds before and after the detection frame and the reproduction time is extended to 10 times (that is, 10 seconds), the audio frame Fa2 is reproduced from the video reproduction time Tc' which is the middle of the high frame rate period. Therefore, the silent time becomes less than five seconds. With the above processing, the reproduction quality is improved.

Also, since the image pickup device 100 sets the reproduction time in synchronization with the scene change timing, there is no need for a reproduction device to detect a scene change, and the reproduction device can reproduce sound according to the scene change without depending on reproduction environment. Also, if the reproduction speed is changed, a data amount of the audio frame increases, and high-speed encoding and a large-capacity encoding buffer are required. However, since the image pickup device 100 does not change the reproduction speed, the high-speed encoding and the large-capacity encoding buffer are not required.

Figure 5:
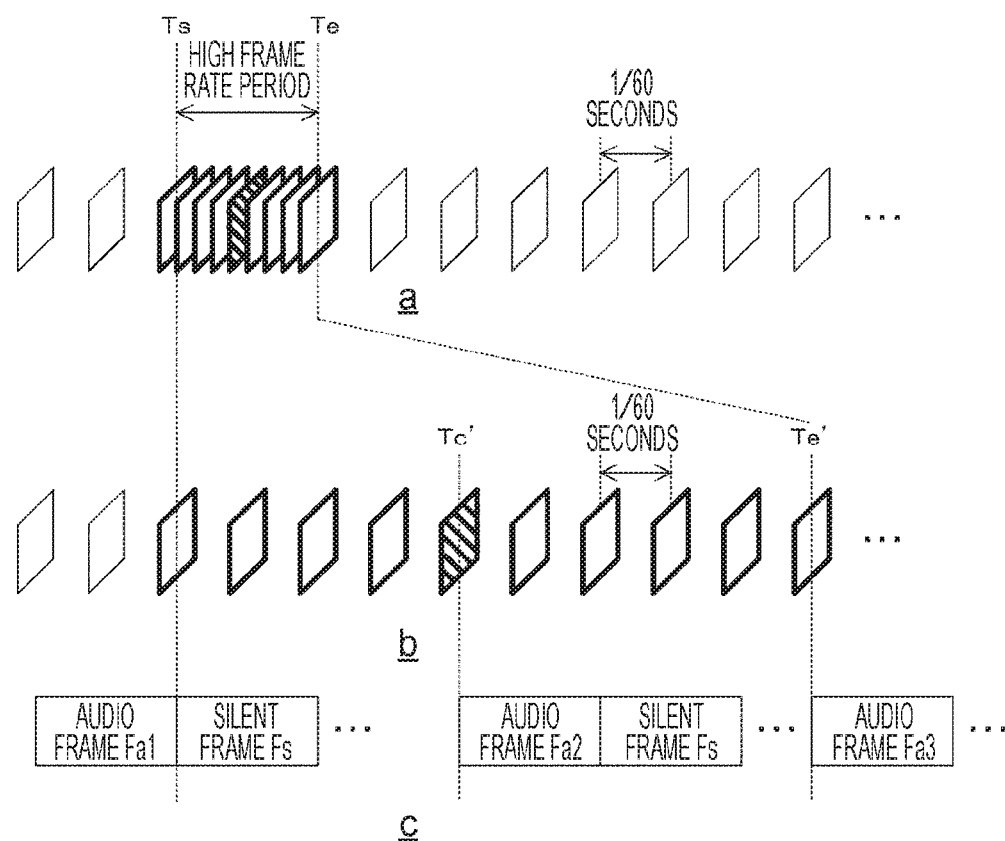
FIG. 5 is a diagram of an exemplary stream in which silent data is inserted according to the first embodiment.

Furthermore, the image pickup device 100 does not insert any audio frames in the silent time in the high frame rate period. However, a silent frame may be inserted as illustrated in FIG. 5. Here, the silent frame means an audio frame of which a volume level is set to zero.

Figure 6:
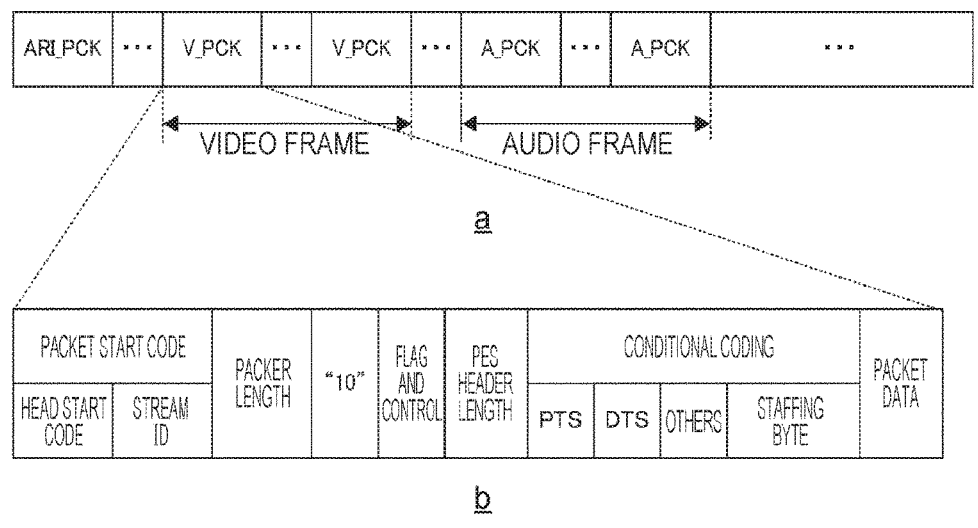
FIG. 6 is a diagram of an exemplary data structure of the stream and a packet according to the first embodiment.

FIG. 6 is a diagram of an exemplary data structure of the stream and the packet according to the first embodiment. a of FIG. 6 is a diagram of an exemplary data structure of a stream. In the MPEG-2TS standard, the stream includes, for example, a packet ARI_PCK including auxiliary data, a video packet V_PCK, and an audio packet A_PCK. The video frame is stored in one or more video packets V_PCK, and the audio frame is stored in one or more audio packets A_PCK.

b of FIG. 6 is a diagram of an exemplary data structure of the video packet V_PCK. In the MPEG-2TS standard, the video packet V_PCK stores a packet start code, a packet length, a code of "10", a flag and control, a PES header length, conditional coding, and packet data. Note that the data structure of the audio packet is similar to that of the video packet.

In the field of the packet start code, a head start code indicating the head of the packet and a stream ID for identifying the stream are stored. In the field of the conditional coding, a PTS indicating the reproduction time and a decoding time stamp (DTS) indicating a decoding time are stored. The PTS_V and the PTS_A are stored in this field.

[Exemplary Operation of Image Pickup Device]

Figure 7:
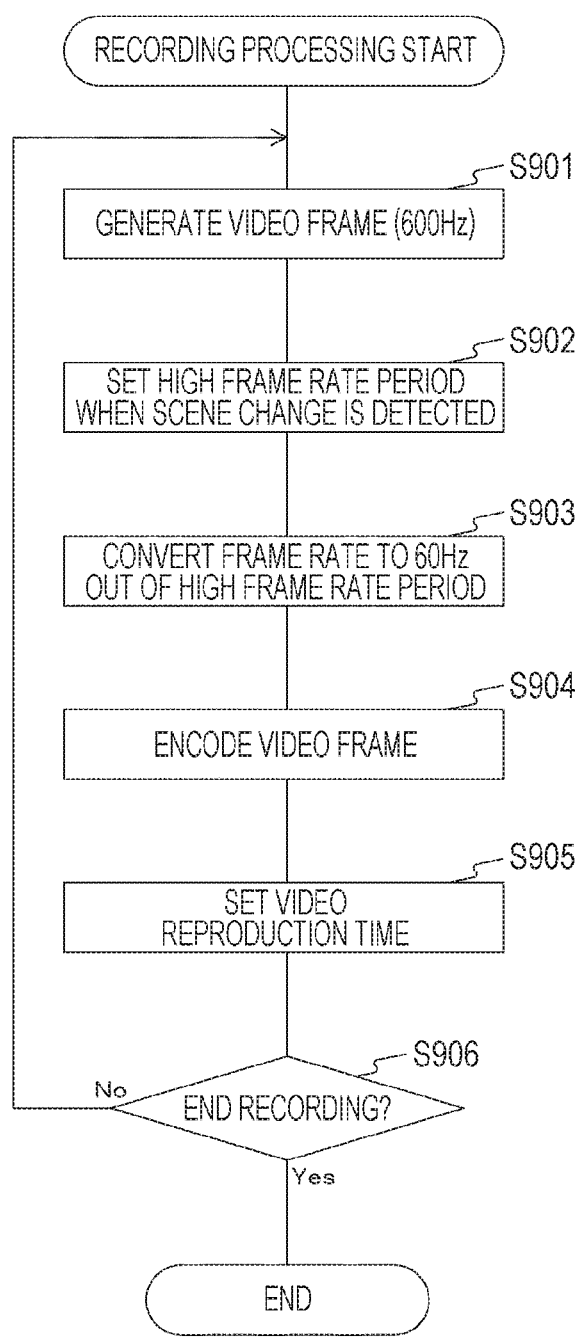
FIG. 7 is a flowchart of exemplary recording processing according to the first embodiment.

FIG. 7 is a flowchart of exemplary recording processing according to the first embodiment. The recording processing starts, for example, when an operation to start recording (to press recording button and the like) is performed. The image pickup device 100 generates a video frame at a high frame rate of 600 Hz (step S901). Also, the image pickup device 100 sets the high frame rate period when a scene change has been detected (step S902) and converts the frame rate to a low frame rate of 60 hertz outside the high frame rate period (step S903).

Then, the image pickup device 100 encodes the video frame (step S904) and sets the video reproduction time to perform reproduction at the low frame rate of 60 hertz to the encoded video frame (step S905). The image pickup device 100 determines whether an operation (to press stop button and the like) to end the recording has been performed (step S906). In a case where the operation to end the recording has not been performed (step S906: No), the image pickup device 100 repeats processing in step S901 or later. On the other hand, in a case where the operation to end the recording has been performed (step S906: Yes), the image pickup device 100 ends the recording processing.

Figure 8:
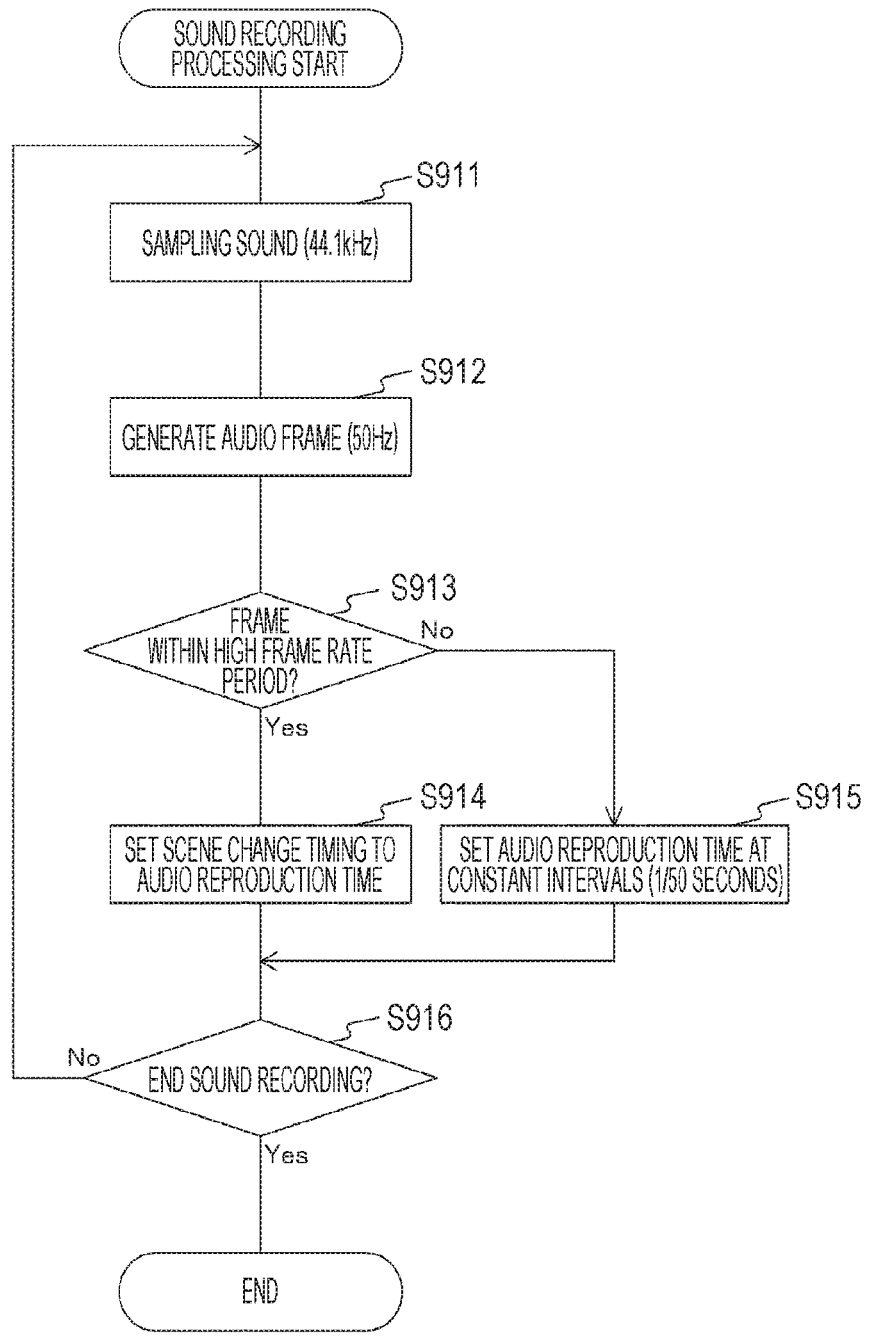
FIG. 8 is a flowchart of exemplary sound recording process according to the first embodiment.

FIG. 8 is a flowchart of exemplary audio recording processing according to the first embodiment. The audio recording processing starts, for example, when an operation to start recording (to press video recording button and the like) is performed. The image pickup device 100 samples sounds at a sampling frequency of 44.1 kilohertz (kHz) (step S911). Then, the image pickup device 100 encodes the sampling data for each 1/50 seconds. As a result, an audio frame is generated at a frame rate of 50 hertz (Hz) (step S912). The image pickup device 100 determines whether the generated frame is a frame in the high frame rate period (step S913).

In a case where the generated frame is a frame in the high frame rate period (step S913: No), the image pickup device 100 sets a timing of the frame in which the scene change has been detected to the audio reproduction time (step S914). On the other hand, in a case where the generated frame is a frame in the high frame rate period (step S913: Yes), the image pickup device 100 sets the audio reproduction time at constant intervals such as 1/50 seconds (step S915). After step S914 or S915, the image pickup device 100 determines whether an operation to end the sound recording (to press stop button and the like) has been performed (step S916). In a case where the operation to end the sound recording has not been performed (step S916: No), the image pickup device 100 repeats processing in step S911 and later. On the other hand, in a case where the operation to end the sound recording has been performed (step S916: Yes), the image pickup device 100 ends the sound recording processing.

In this way, according to the first embodiment of the present technology, since the image pickup device 100 sets the audio reproduction time to the time synchronized with the reproduction time of the frame at the time of the scene change in the high frame rate period, it is possible to reproduce the sound in synchronization with the timing of the scene change. As a result, the silent time is shortened, and the reproduction quality is improved.

2. Second Embodiment

In the first embodiment described above, the image pickup device 100 has determined the high frame rate period on the basis of the detection result of the scene change regardless of the operation by the user. However, the image pickup device 100 may determine the high frame rate period according to the operation by the user. The image pickup device 100 according to the second embodiment is different from the first embodiment in that the high frame rate period is set according to the operation by the user.

Figure 9:
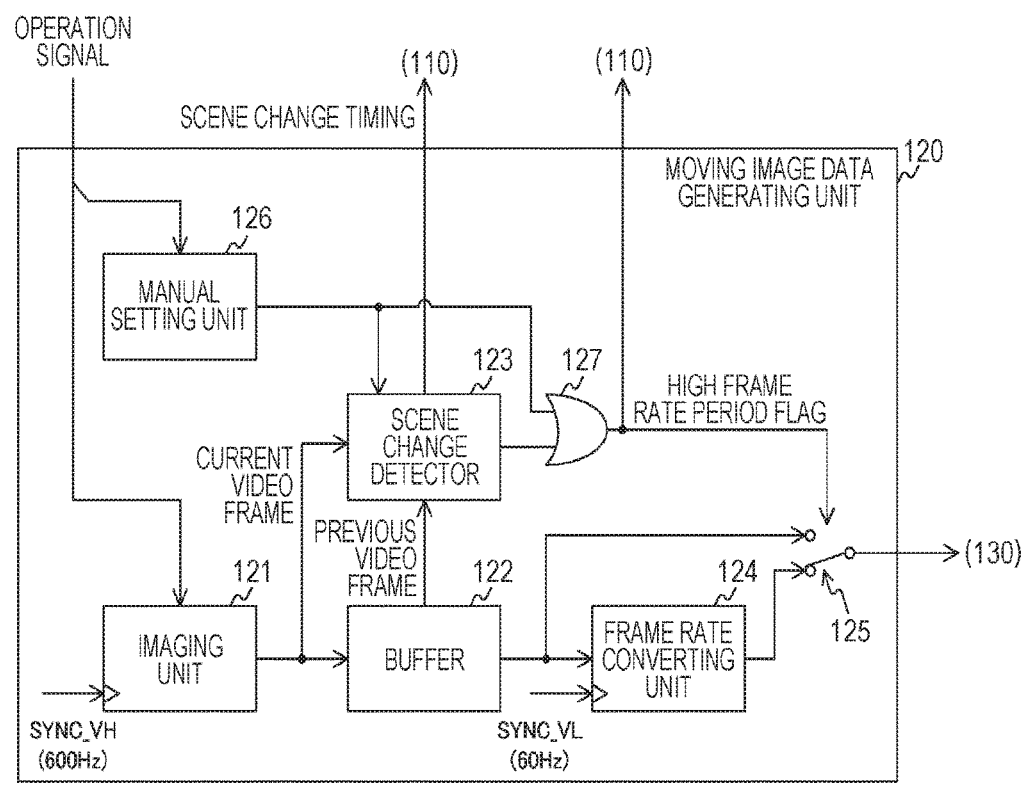
FIG. 9 is a block diagram of an exemplary configuration of a moving image data generating unit according to a second embodiment.

FIG. 9 is a block diagram of an exemplary configuration of a moving image data generating unit 120 according to the second embodiment. The moving image data generating unit 120 of the second embodiment is different from that of the first embodiment in that a manual setting unit 126 and an OR gate 127 are further included.

The manual setting unit 126 sets the high frame rate period according to an operation signal. For example, a period from the time when a predetermined operation to start high-speed shooting is performed until a certain period of time elapses is set as the high frame rate period. Alternatively, a fixed period with the timing at which the operation is performed as the center is set as the high frame rate period. The manual setting unit 126 supplies a high frame rate period flag indicating the set high frame rate period to the OR gate 127 and a scene change detector 123.

The OR gate 127 supplies a logical sum (OR) of the high frame rate period flag from the manual setting unit 126 and the high frame rate period flag from the scene change detector 123 to a switching unit 125 and a timing control unit 110.

Also, the scene change detector 123 according to the second embodiment does not detect a scene change in the high frame rate period set by the manual setting unit 126.

In addition, the audio reproduction time setting unit 112 according to the second embodiment further obtains a high frame rate period flag. Then, when the high frame rate period flag is "one", the audio reproduction time setting unit 112 determines whether the high frame rate period has been manually set according to whether a scene change detection timing has been detected. In a case where the high frame rate period has been manually set, the audio reproduction time setting unit 112 sets the specific timing in the high frame rate period to the audio reproduction time of the audio frame in the period. For example, a start timing of the high frame rate period is set as the audio reproduction time. On the other hand, in a case where the high frame rate period has not been manually set, the audio reproduction time setting unit 112 sets the audio reproduction time in synchronization with the scene change detection timing similarly to the first embodiment.

Furthermore, although the scene change detector 123 does not detect the scene change in the high frame rate period which has been manually set, the scene change detector 123 may also detect the scene change in the high frame rate period which has been manually set. With this configuration, the audio reproduction time setting unit 112 sets the audio reproduction time in synchronization with the scene change timing in a case where a scene change occurs within the frame rate period, and sets a specific timing to the audio reproduction time in a case where the scene change does not occur.

Figure 10:
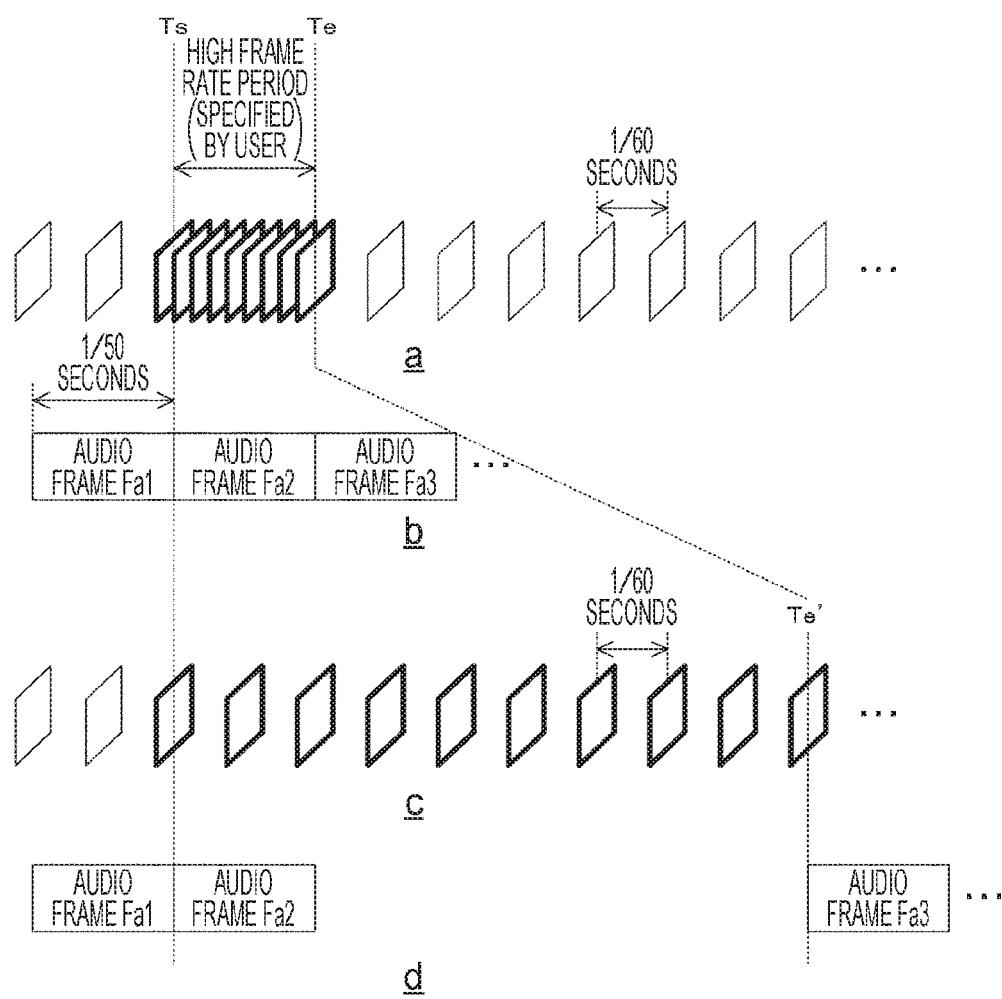
FIG. 10 is a diagram of an exemplary stream according to the second embodiment.

FIG. 10 is a diagram of an exemplary stream according to the second embodiment. a of FIG. 10 is a diagram of an exemplary frame after the frame rate has been converted. A period specified by the user is set as the high frame rate period, and the frame rate is converted to, for example, 60 hertz (Hz) outside the high frame rate period.

b of FIG. 10 is a diagram of an exemplary audio frame. For example, the sampling data is encoded for each 1/50 seconds, and frames such as audio frames Fa1, Fa2, and Fa3 are generated.

c of FIG. 10 is an exemplary video frame to which the video reproduction time has been set. For each video frame, the video reproduction time to perform the reproduction, for example, at a low frame rate of 60 hertz (Hz) is set.

d of FIG. 10 is a diagram of an exemplary audio frame to which the audio reproduction time has been set. The audio reproduction time is set at constant intervals (for example, 1/50 seconds) relative to the audio frames Fa1, Fa3 and the like outside the high frame rate period. On the other hand, the start timing Ts of the high frame rate period is set as the audio reproduction time relative to the audio frame Fa2 in the high frame rate period.

Figure 11:
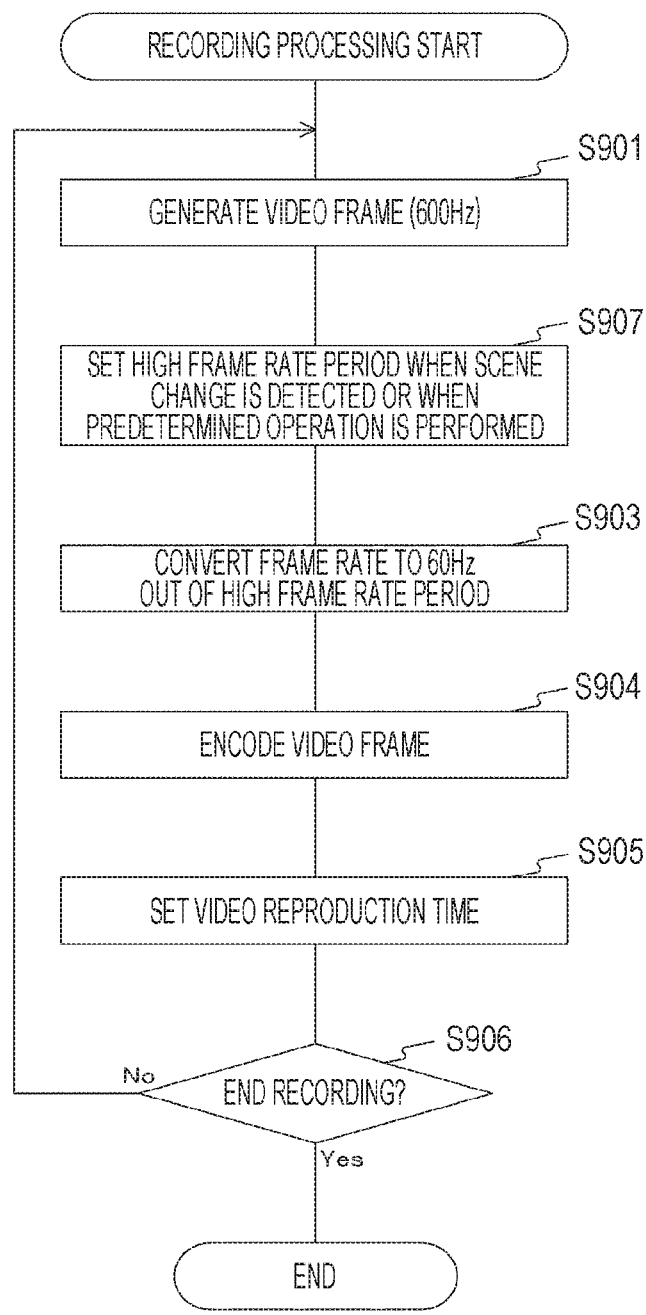
FIG. 11 is a flowchart of exemplary recording processing according to the second embodiment.

FIG. 11 is a flowchart of exemplary recording processing according to the second embodiment. The recording processing according to the second embodiment is different from that of the first embodiment in that step S907 is executed instead of step S902.

After generating the video frame (step S901), the image pickup device 100 sets the high frame rate period at the time when a scene change is detected or when a predetermined operation is performed (step S907). Then, the image pickup device 100 performs the processing in step S903 and later.

Figure 12:
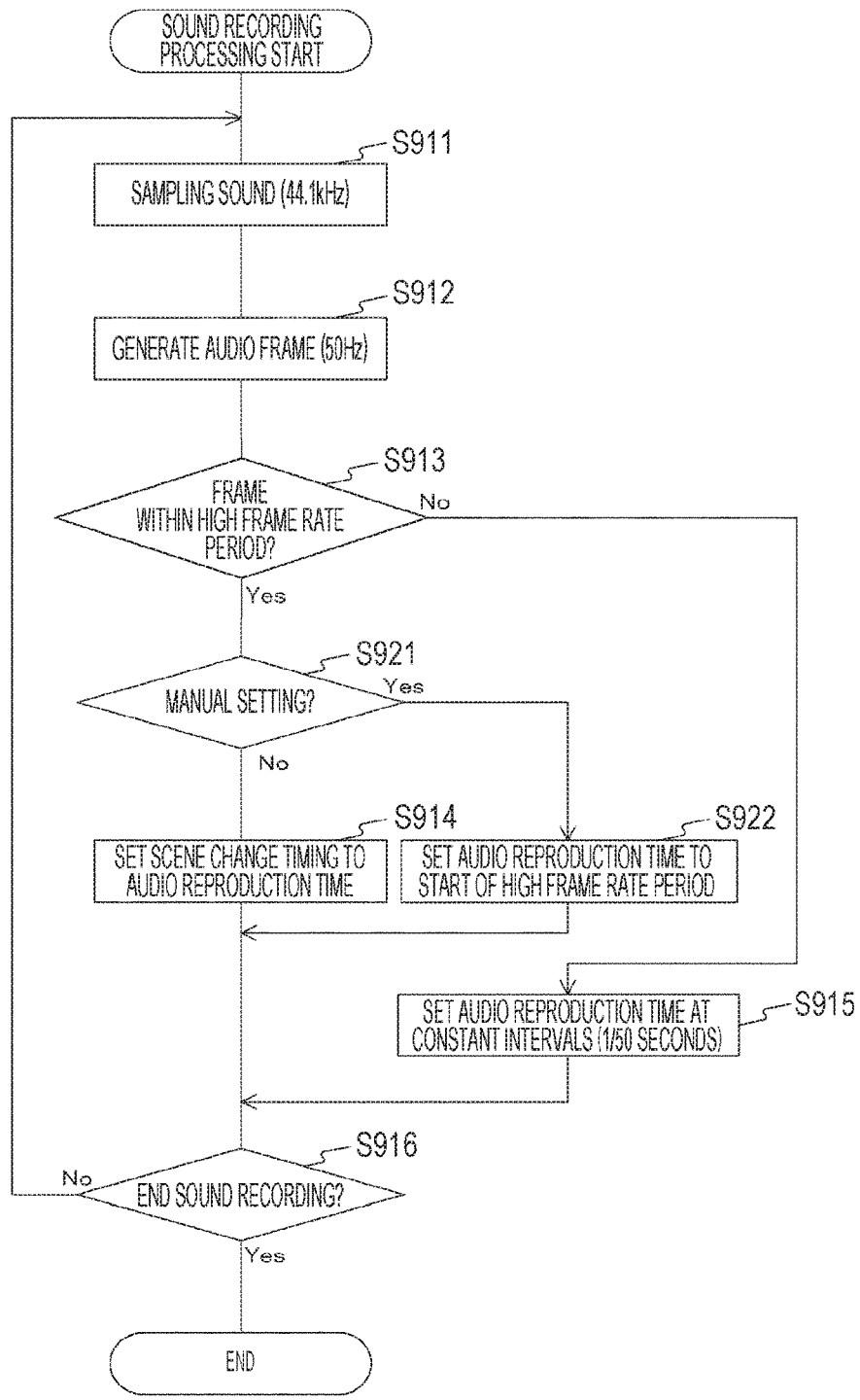
FIG. 12 is a flowchart of exemplary sound recording processing according to the second embodiment.

FIG. 12 is a flowchart of exemplary sound recording processing according to the second embodiment. The sound recording processing according to the second embodiment is different from that of the first embodiment in that steps S921 and S922 are further executed.

In a case where the generated audio frame is a frame in the high frame rate period (step S913: Yes), the image pickup device 100 determines whether the high frame rate period is a period which has been manually set (step S921). In a case where the period has been manually set (step S921: Yes), the image pickup device 100 sets the start timing of the high frame rate period to the audio reproduction time (step S922). On the other hand, in a case where the period has not been manually set (step S921: No), the image pickup device 100 sets the scene change timing to the audio reproduction time (step S914). After step S914 or S922, the image pickup device 100 executes step S916.

In this way, according to the second embodiment of the present technology, the image pickup device 100 sets a specific time in the high frame rate period which has been manually set as the audio reproduction time in the period. Therefore, it is possible to reproduce sound from an appropriate position in the manually set period.

MODIFICATION

In the second embodiment described above, the image pickup device 100 sets the start timing of the high frame rate period which has been manually set as the audio reproduction time. However, a specific timing other than the start timing can also be set as the audio reproduction time. For example, an intermediate timing of the high frame rate period may be set as the audio reproduction time. The image pickup device 100 according to the modification of the second embodiment is different from that of the second embodiment in that the intermediate timing of the high frame rate period which has been manually set is set as the audio reproduction time.

Figure 13:
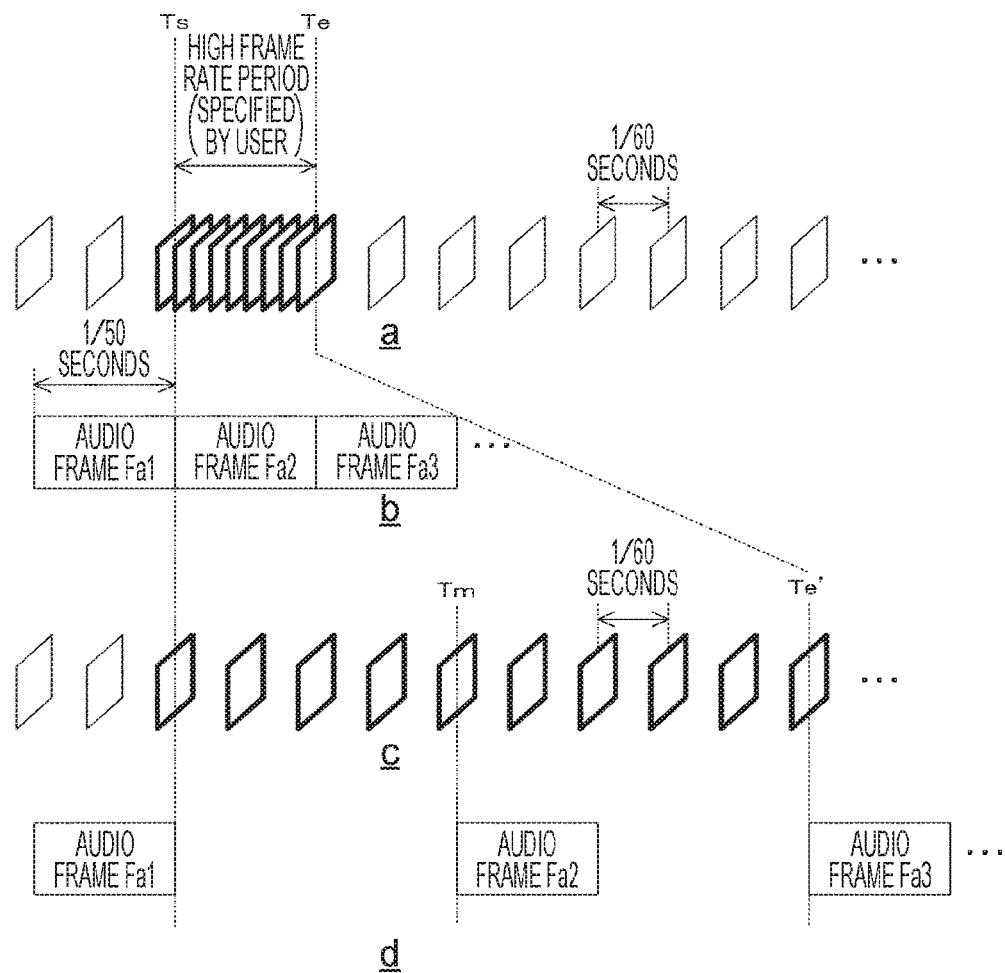
FIG. 13 is a diagram of an exemplary stream according to a modification of the second embodiment.

FIG. 13 is a diagram of an exemplary stream according to a modification of the second embodiment. a of FIG. 13 is a diagram of an exemplary frame after the frame rate has been converted. b of FIG. 13 is a diagram of an exemplary audio frame. c of FIG. 13 is a diagram of an exemplary video frame to which the video reproduction time has been set. These configurations are similar to those of the second embodiment.

d of FIG. 13 is a diagram of an exemplary audio frame to which the audio reproduction time has been set. An intermediate timing Tm of the high frame rate period is set as the audio reproduction time relative to the audio frame Fa2 in the high frame rate period.

In this way, according to the modification of the second embodiment, since the image pickup device 100 sets the intermediate time in the high frame rate period which has been manually set as the audio reproduction time in the period, a silent time can be shortened in the period which has been manually set.

3. Third Embodiment

In the first embodiment described above, the image pickup device 100 reproduces the sound without changing the audio reproduction speed. However, it is also possible to reproduce the sound as changing the reproduction speed. Change of the audio reproduction speed is also referred to as speech speed conversion. The image pickup device 100 according to the third embodiment is different from that of the first embodiment in that the audio reproduction speed is changed.

Figure 14:
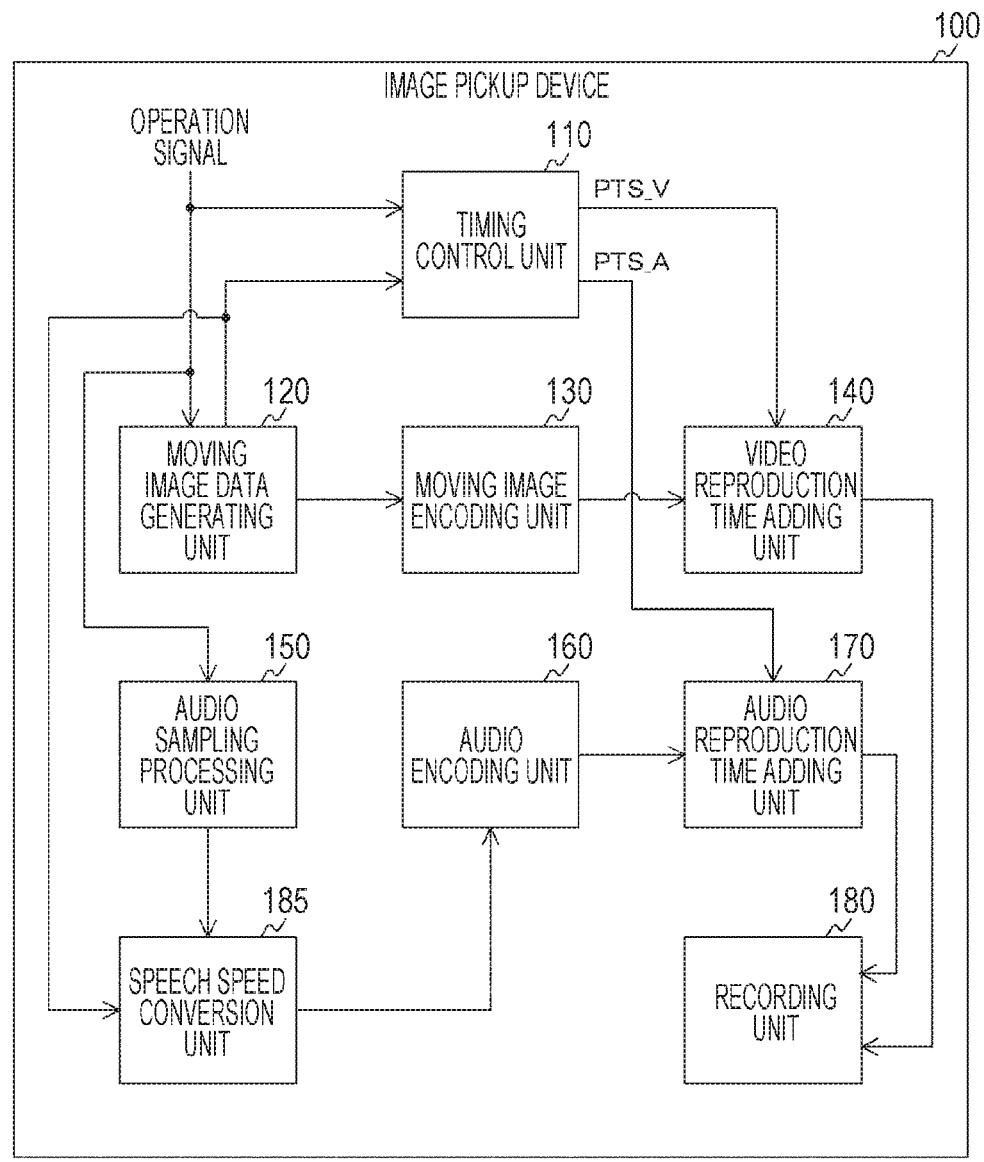
FIG. 14 is a block diagram of an exemplary configuration of an image pickup device according to a third embodiment.

FIG. 14 is a block diagram of an exemplary configuration of the image pickup device 100 according to the third embodiment. The image pickup device 100 according to the third embodiment is different from that of the first embodiment in that a speech speed conversion unit 185 is further included.

The speech speed conversion unit 185 changes the reproduction speed of the sampling data in the high frame rate period to a slower speed (that is, speech speed conversion). The speech speed conversion unit 185 slows the reproduction speed by a fixed magnification (for example, ½ times). Regarding the magnification, a ratio higher than a ratio of the frame rate at the time of imaging to the frame rate at the time of reproduction is set. For example, in a case where an image is imaged at 600 hertz (Hz) and is reproduced at 60 hertz (Hz), a ratio higher than 1/10 (½ and the like) is set. The speech speed conversion unit 185 supplies the converted sampling data to the audio encoding unit 160. Note that the speech speed conversion unit 185 is an exemplary reproduction speed changing unit described in claims.

Figure 15:
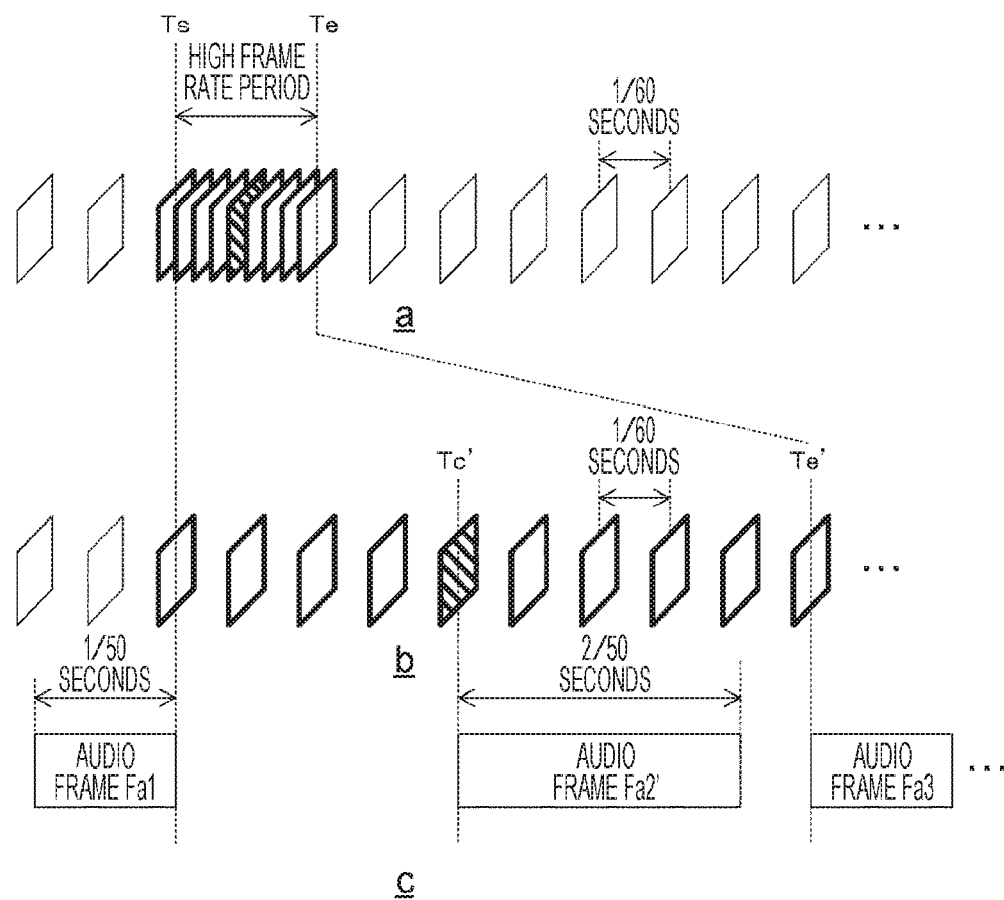
FIG. 15 is a diagram of an exemplary stream according to the third embodiment.

FIG. 15 is a diagram of an exemplary stream according to the third embodiment. a of FIG. 15 is a diagram of an exemplary frame after the frame rate has been converted. b of FIG. 15 is a diagram of an exemplary video frame to which the video reproduction time has been set. These configurations are similar to those of the second embodiment.

c of FIG. 15 is a diagram of an exemplary audio frame to which the speech speed conversion has been performed and the audio reproduction time has been set. The reproduction speed of an audio frame Fa2' in the high frame rate period is reduced to ½, and a reproduction time of the audio frame Fa2' is extended from 1/50 seconds to 2/50 seconds. With the above processing, the silent time in the high frame rate period is further shortened, and the reproduction quality is improved.

Figure 16:
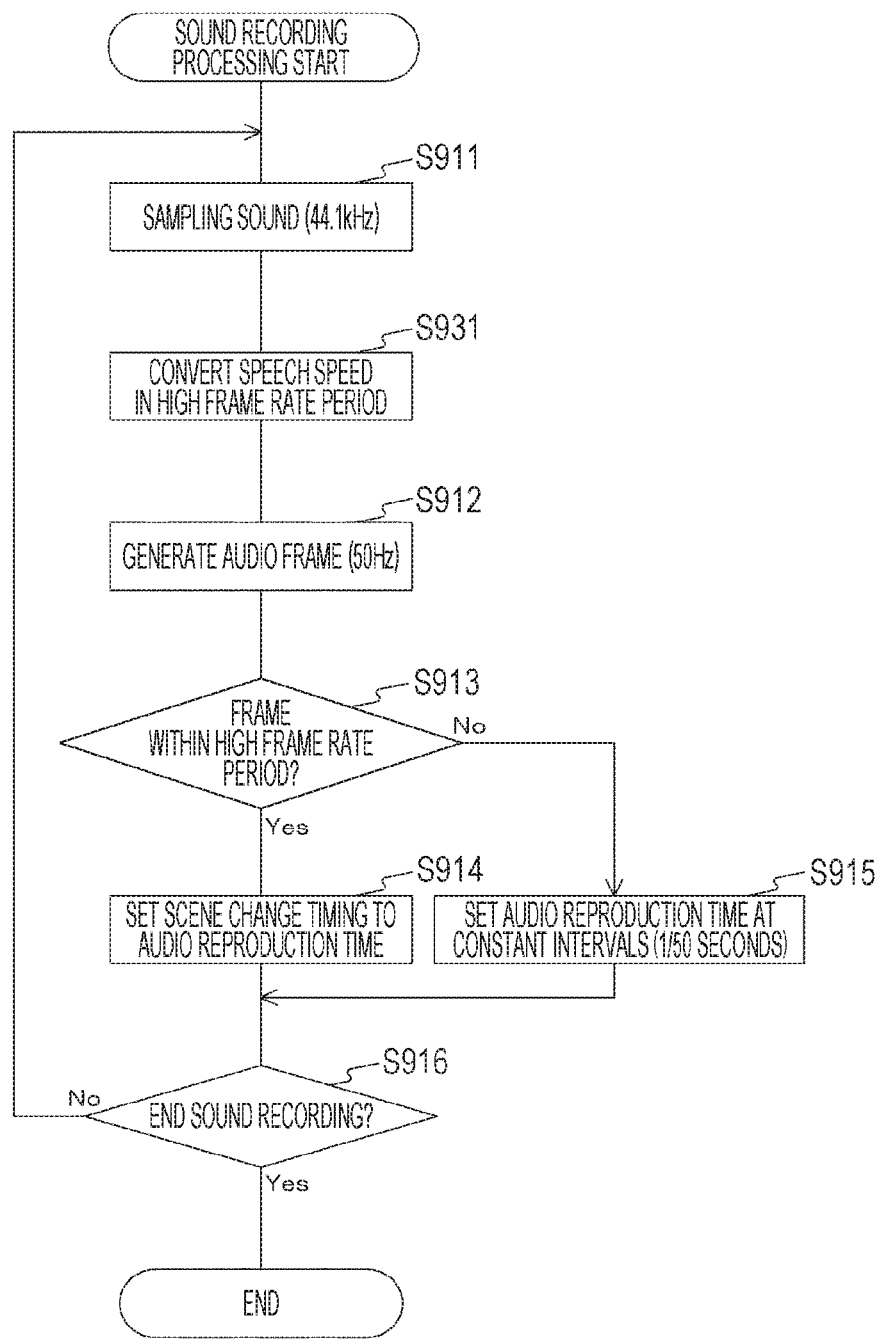
FIG. 16 is a flowchart of exemplary sound recording processing according to the third embodiment.

FIG. 16 is a flowchart of exemplary sound recording processing according to the third embodiment. The sound recording processing according to the third embodiment is different from that of the first embodiment in that step S931 is further executed.

After sampling the sound (step S911), the image pickup device 100 converts the speech speed of the sampling data in the high frame rate period (step S931). After step S931, the image pickup device 100 executes processing in step S912 and later.

In this way, according to the third embodiment of the present technology, since the image pickup device 100 slows the audio reproduction speed in the high frame rate period, the silent time in the high frame rate period can be further shortened.

4. Fourth Embodiment

In the first embodiment, the sound in the high frame rate period is reproduced once. However, the audio frame of the sound in the high frame rate period may be duplicated to repeatedly reproduce the sound. An image pickup device 100 according to a fourth embodiment is different from that of the first embodiment in that the audio frame is duplicated to repeatedly reproduce the sound.

Figure 17:
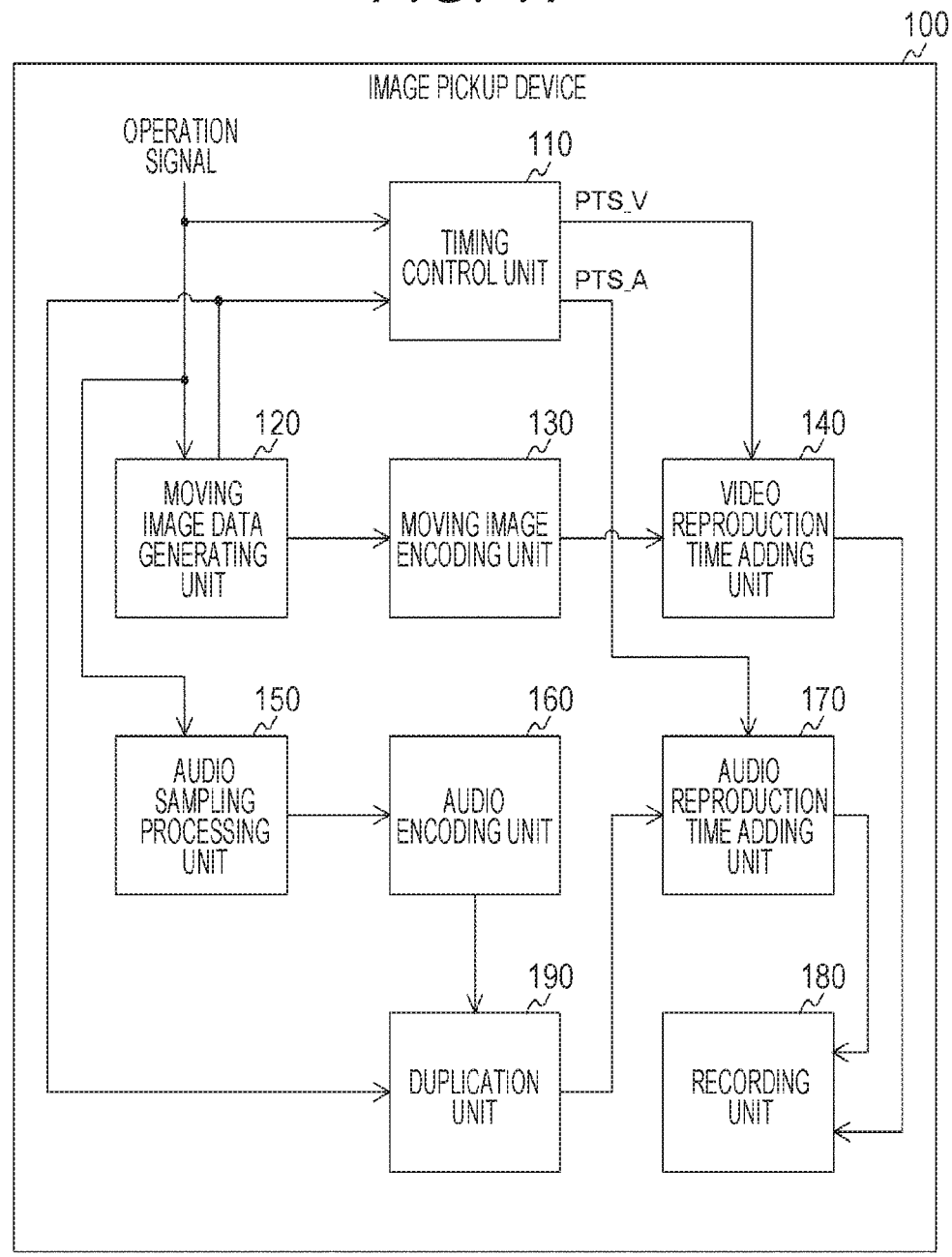
FIG. 17 is a block diagram of an exemplary configuration of an image pickup device according to a fourth embodiment.

FIG. 17 is a block diagram of an exemplary configuration of the image pickup device 100 according to the fourth embodiment. The image pickup device 100 according to the fourth embodiment is different from that of the first embodiment in that a duplication unit 190 is further included.

The duplication unit 190 duplicates a frame in the high frame rate period from among a plurality of audio frames generated by an audio encoding unit 160 at the predetermined number of times (for example, once). The duplication unit 190 supplies a frame of the duplication source and the duplicated frame to an audio reproduction time adding unit 170.

Also, an audio reproduction time setting unit 112 according to the fourth embodiment sets the time synchronized with a reproduction end time of the frame of the duplication source as the audio reproduction time regarding the duplicated frame.

Figure 18:
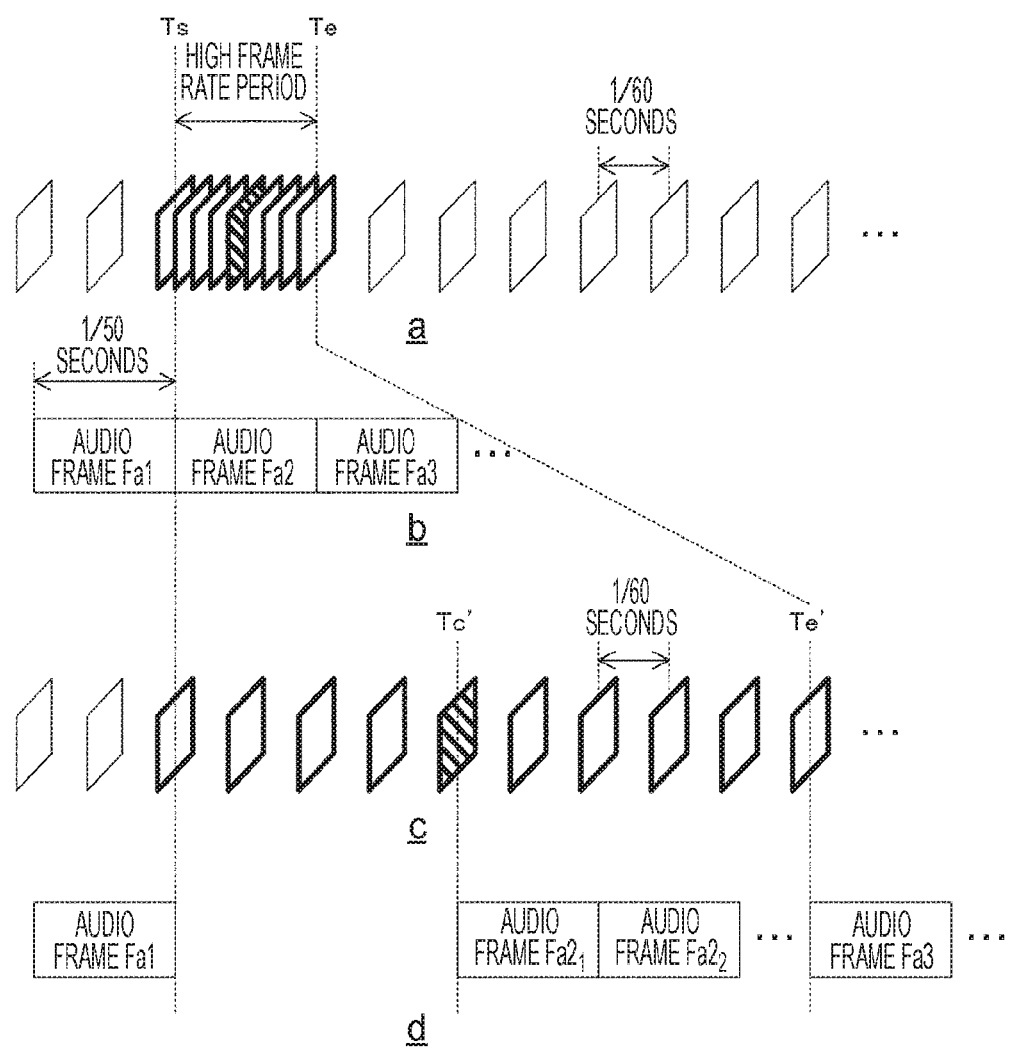
FIG. 18 is a diagram of an exemplary stream according to the fourth embodiment.

FIG. 18 is a diagrams of an exemplary stream according to the fourth embodiment. a of FIG. 18 is a diagram of an exemplary frame after the frame rate has been converted. b of FIG. 18 is a diagram of an exemplary audio frame. c of FIG. 18 is a diagram of an exemplary video frame to which the video reproduction time has been set. These configurations are similar to those of the first embodiment.

d of FIG. 18 is a diagram of an exemplary audio frame to which the audio reproduction time has been set. An audio frame Fa2 with a high frame rate is duplicated, and a frame such as a frame Fa$2_2$ is newly generated.

Also, it is assumed that the audio frame of the duplication source be a frame Fa$2_1$. A reproduction time of the duplicated frame Fa$2_2$ is set to the reproduction end time of the frame Fa$2_1$ of the duplication source. By setting the reproduction time in this way, the same sound is repeatedly reproduced in the high frame rate period.

Furthermore, the image pickup device 100 may duplicate an audio frame of which the reproduction speed has been changed. For example, the reproduction speed of the sound in the high frame rate period may be halved, and the audio frame after the conversion may be duplicated and reproduced twice. With the above processing, the silent time can be further shortened. Also, the image pickup device 100 may insert a certain silent time between the plurality of audio frames generated by duplication. For example, in a case where two audio frames have been generated by duplication, it is preferable that the image pickup device 100 set a time obtained by adding a fixed silent time to the reproduction end time of a first frame as a reproduction time of a second frame.

Figure 19:
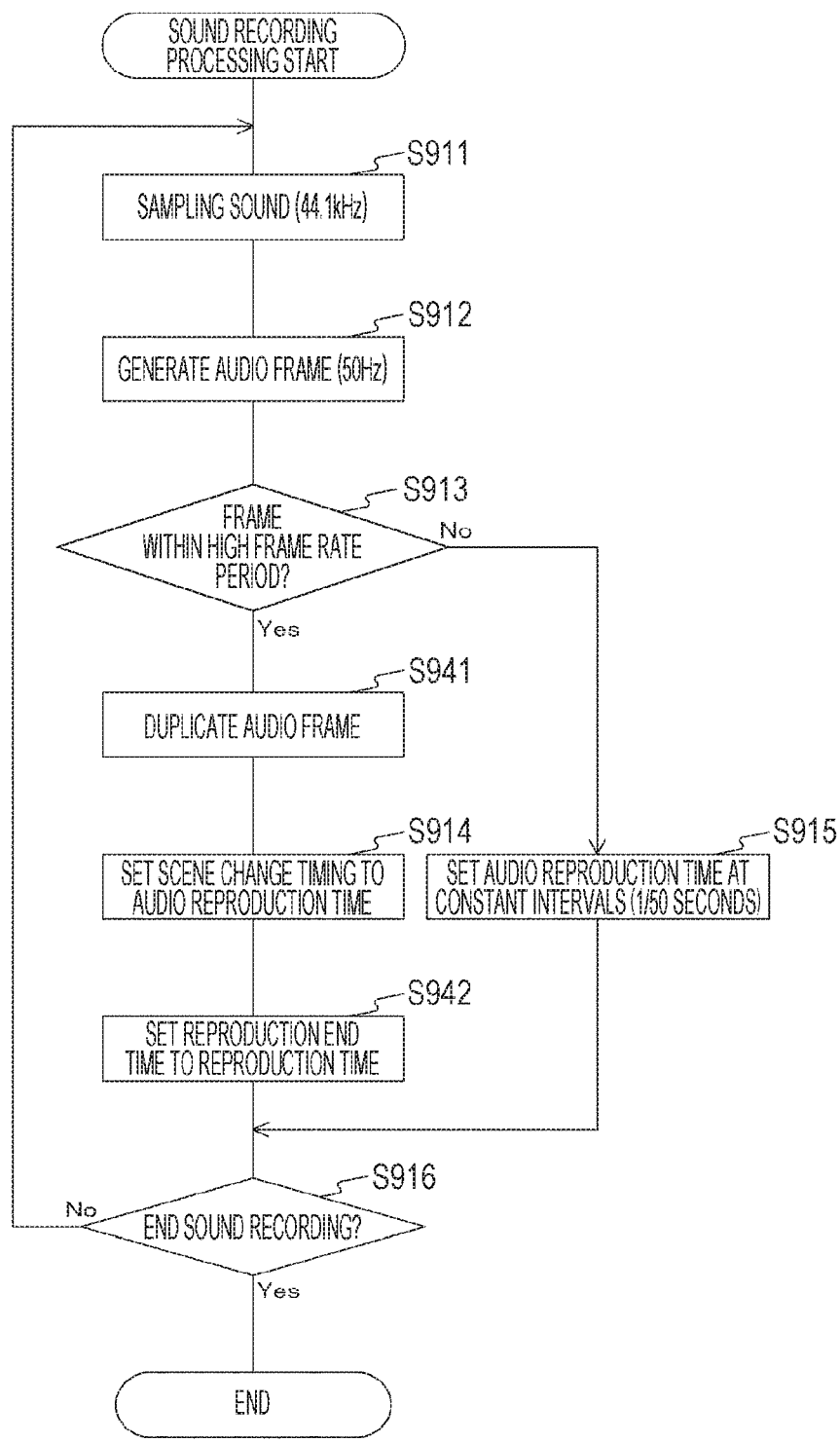
FIG. 19 is a flowchart of exemplary sound recording processing according to the fourth embodiment.

FIG. 19 is a flowchart of exemplary sound recording processing according to the fourth embodiment. The sound recording processing according to the fourth embodiment is different from that of the first embodiment in that steps S941 and S942 are further executed.

If the audio frame is a frame in the high frame rate period (step S913: Yes), the image pickup device 100 duplicates the audio frame (step S941). The image pickup device 100 sets a scene change timing as the reproduction time of the frame of the duplication source (step S914) and sets the reproduction end time of the duplication source as the reproduction time of the duplicated frame (step S942). After step S942, the image pickup device 100 executes step S916.

In this way, according to the fourth embodiment, since the image pickup device 100 duplicates the audio frame in the high frame rate period and sets the reproduction time to repeatedly perform reproduction, the silent time in the high frame rate period can be further shortened.

5. Fifth Embodiment

In the first embodiment described above, the image pickup device 100 records the moving image and the sound as they are. However, the image pickup device 100 may further perform edit processing such as to add a sound effect and narration. The image pickup device 100 according to a fifth embodiment is different from that of the first embodiment in that the editing processing for adding sound is further performed.

Figure 20:
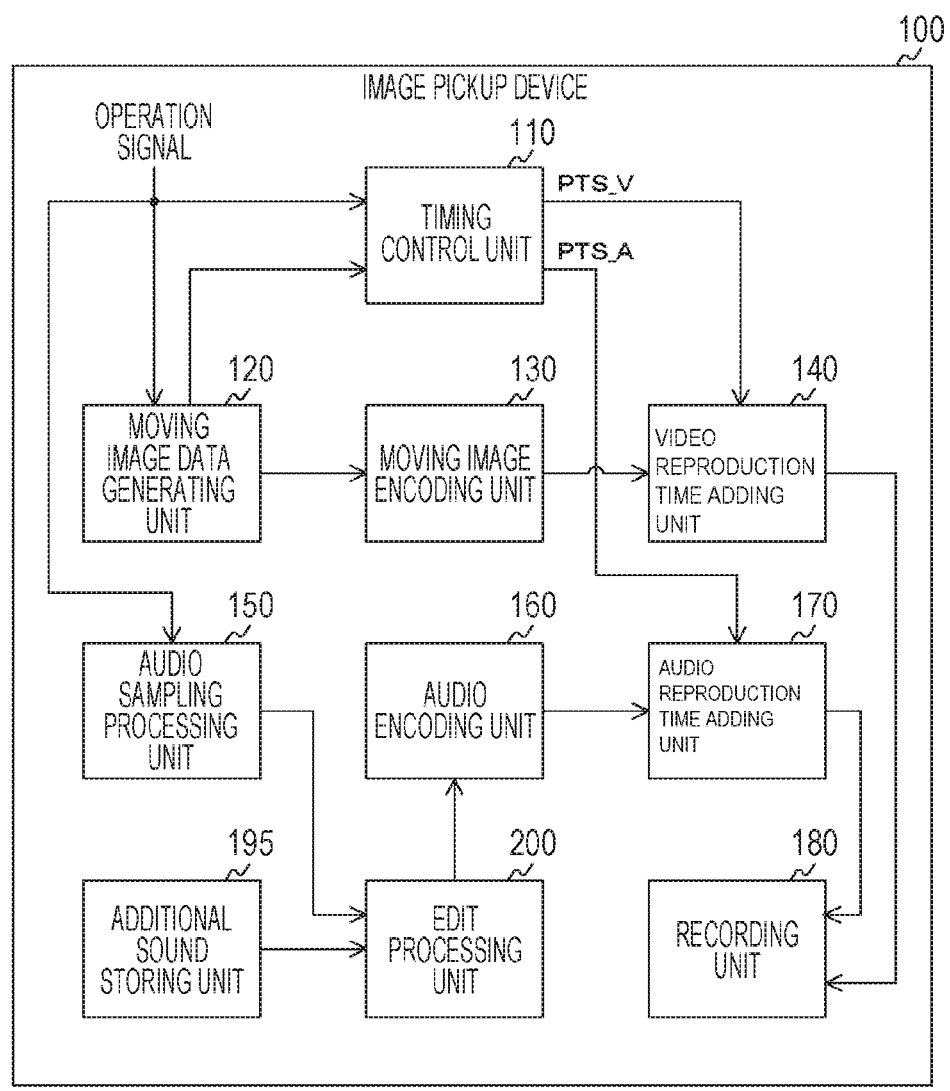
FIG. 20 is a block diagram of an exemplary configuration of an image pickup device according to a fifth embodiment.

FIG. 20 is a block diagram of an exemplary configuration of the image pickup device 100 according to the fifth embodiment. The image pickup device 100 according to the fifth embodiment is different from that of the first embodiment in that an additional sound storage unit 195 and an edit processing unit 200 are further included.

The additional sound storage unit 195 stores previously recorded additional audio data such as sound effects and narration.

The edit processing unit 200 performs processing for adding additional audio data as the edit processing. The edit processing unit 200 reads additional audio data specified by the user from the additional sound storage unit 195 and superimposes the additional audio data on sampling data from an audio sampling processing unit 150 according to an operation by the user.

In this way, according to the fifth embodiment of the present technology, since the image pickup device 100 superimposes the additional audio data on the sampling data, it is possible to add the sound desired by the user to the moving image.

Note that the embodiments indicate examples for embodying the present technology, and matters in the embodiments and invention specifying matters in claims have correspondence relations. Similarly, the invention specifying matters in claims and the matters in the embodiments of the present technology denoted by the same names have correspondence relations. However, the present technology is not limited to the embodiments, and can be embodied by applying various modifications to the embodiments without departing from the scope of the present technology.

Also, the processing procedure described in the above embodiments may be understood as a method having the series of procedures, a program for causing a computer to execute the series of procedures, or a recording medium for storing the program. As the recording medium, for example, a compact disc (CD), a mini disc (MD), a digital versatile disc (DVD), a memory card, a Blu-ray (registered trademark) disc, or the like can be used.

Note that the effects described herein are not limited, and the effect may be any effects described in the present disclosure.

Note that, the present technology can have the following configuration.

(1) An image pickup device including:

an imaging unit configured to image a plurality of frame rates at a predetermined frame rate;

a scene change detector configured to detect a frame at the time of a scene change from among the plurality of frames as a detection frame;

a frame rate converting unit configured to convert a frame rate of a frame imaged outside a detection period including an imaging time of the detection frame from among the plurality of frames to a low frame rate lower than the predetermined frame rate;

a video reproduction time setting unit configured to set a reproduction time when reproduction is performed at the low frame rate as a video reproduction time of each of the plurality of frames; and an audio reproduction time setting unit configured to set an audio reproduction time at constant intervals to a plurality of sounds recorded at the constant intervals outside the detection period and set an audio reproduction time in synchronization with the video reproduction time corresponding to the detection frame relative to the sound recorded in the detection period.

(2) The image processing apparatus according to (1), further including:

a reproduction speed changing unit configured to decrease a reproduction speed of the sound recorded in the detection period.

(3) The image processing apparatus according to (1) or (2), further including:

a duplication unit configured to duplicate data of the sound recorded in the detection period to generate duplicated data, in which the audio reproduction time setting unit sets a time in synchronization with a reproduction end time of the sound recorded in the detection period to an audio reproduction time of the duplicated data.

(4) The image processing apparatus according to any one of (1) to (3), further including:

a manual setting unit configured to set a fixed period as a manual setting period according to an operation by a user, in which the frame rate converting unit converts a frame rate of a frame imaged in a period other than the detection period and the manual setting period to the low frame rate, and the audio reproduction time setting unit sets a specific time in the manual setting period as an audio reproduction time relative to sound recorded in the manual setting period.

(5) The image processing apparatus according to any one of (1) to (4), further including:

a sound superimposing unit configured to superimpose a predetermined additional sound on the sound.

(6) An image pickup device including:

an imaging unit configured to image a plurality of frame rates at a predetermined frame rate;

a scene change detector configured to detect a frame at the time of a scene change from among the plurality of frames as a detection frame;

a frame rate converting unit configured to convert a frame rate of a frame imaged outside a detection period including an imaging time of the detection frame from among the plurality of frames to a low frame rate lower than the predetermined frame rate;

a video reproduction time setting unit configured to set a reproduction time when reproduction is performed at the low frame as a video reproduction time of each of the plurality of frames; and an audio reproduction time setting unit configured to set an audio reproduction time at constant intervals to a plurality of sounds recorded at the constant intervals outside the detection period and set an audio reproduction time in synchronization with the video reproduction time corresponding to the detection frame relative to the sound recorded in the detection period.

(7) A program for causing a computer to execute:

a scene change detecting process of detecting a frame at the time of a scene change from among a plurality of frames imaged at a predetermined frame rate as a detection frame by a scene change detector;

a frame rate converting process of converting a frame rate of a frame imaged outside the detection period including an imaging time of the detection frame from among the plurality of frames to a low frame rate lower than the predetermined frame rate by a frame rate converting unit;

a video reproduction time setting process of setting a reproduction time when reproduction is performed at the low frame rate as a video reproduction time of each of the plurality of frames by a video reproduction time setting unit; and an audio reproduction time setting process of setting an audio reproduction time at constant intervals to a plurality of sounds recorded at the constant intervals outside the detection period and setting an audio reproduction time in synchronization with the video reproduction time corresponding to the detection frame relative to the sound recorded in the detection period by an audio reproduction time setting unit.

(8) A program for causing a computer to execute:

a scene change detecting process of detecting a frame at the time of a scene change from among a plurality of frames imaged at a predetermined frame rate as a detection frame by a scene change detector;

a frame rate converting process of converting a frame rate of a frame imaged outside the detection period including an imaging time of the detection frame from among the plurality of frames to a low frame rate lower than the predetermined frame rate by a frame rate converting unit;

a video reproduction time setting process of setting a reproduction time when reproduction is performed at the low frame rate as a video reproduction time of each of the plurality of frames by a video reproduction time setting unit; and an audio reproduction time setting process of setting an audio reproduction time at constant intervals to a plurality of sounds recorded at the constant intervals outside the detection period and setting an audio reproduction time in synchronization with the video reproduction time corresponding to the detection frame relative to the sound recorded in the detection period by an audio reproduction time setting unit.

REFERENCE SIGNS LIST 100 image pickup device
110 timing control unit
111 video reproduction time setting unit
112 audio reproduction time setting unit
120 moving image data generating unit
121 imaging unit
122 buffer
123 scene change detector
124 frame rate converting unit
125 switching unit
126 manual setting unit
127 OR (logical sum) gate
130 moving image encoding unit
140 video reproduction time adding unit
150 audio sampling processing unit 160 audio encoding unit
170 audio reproduction time adding unit
180 recording unit
185 speech speed conversion unit
190 duplication unit
195 additional sound storage unit
200 edit processing unit

The invention claimed is:

1. An image processing apparatus comprising:
a scene change detector configured to detect a frame at the time of a scene change from among a plurality of frames imaged at a predetermined frame rate as a detection frame;
a frame rate converting unit configured to convert a frame rate of at least one of the plurality of frames imaged outside a detection period of the detection frame to a low frame rate lower than the predetermined frame rate;
a video reproduction time setting unit configured to set a reproduction time when reproduction is performed at the low frame rate as a video reproduction time of each of the plurality of frames; and
an audio reproduction time setting unit configured to set an audio reproduction time at constant intervals to a plurality of sounds recorded at the constant intervals outside the detection period and set the audio reproduction time in synchronization with the video reproduction time for sound recorded in the detection period.

2. The image processing apparatus according to claim 1, further comprising:
a reproduction speed changing unit configured to decrease a reproduction speed of the sound recorded in the detection period.

3. The image processing apparatus according to claim 1, further comprising:
a duplication unit configured to duplicate data of the sound recorded in the detection period to generate duplicated data, wherein
the audio time setting unit sets a time in synchronization with a reproduction end time of the sound recorded in the detection period to an audio reproduction time of the duplicated data.

4. The image processing apparatus according to claim 1, further comprising:
a manual setting unit configured to set a fixed period as a manual setting period according to an operation by a user, wherein
the frame rate converting unit converts a frame rate of at least one of the plurality of frames imaged in a period other than the detection period and the manual setting period to the low frame rate, and
the audio reproduction time setting unit sets a specific time in the manual setting period as the audio reproduction time relative to sound recorded in the manual setting period.

5. The image processing apparatus according to claim 1, further comprising:
a sound superimposing unit configured to superimpose a predetermined additional sound on the sound.

6. An image pickup device comprising:
an imaging unit configured to image a plurality of frames at a predetermined frame rate;
a scene change detector configured to detect a frame at the time of a scene change from among the plurality of frames as a detection frame;
a frame rate converting unit configured to convert a frame rate of at least one of the plurality of frames imaged outside a detection period of the detection frame to a low frame rate lower than the predetermined frame rate;
a video reproduction time setting unit configured to set a reproduction time when reproduction is performed at the low frame rate as a video reproduction time of each of the plurality of frames; and
an audio reproduction time setting unit configured to set an audio reproduction time at constant intervals to a plurality of sounds recorded at the constant intervals outside the detection period and set the audio reproduction time in synchronization with the video reproduction time for sound recorded in the detection period.

7. The image pickup device according to claim 6, further comprising:
a reproduction speed changing unit configured to decrease a reproduction speed of the sound recorded in the detection period.

8. The image pickup device according to claim 6, further comprising:
a duplication unit configured to duplicate data of the sound recorded in the detection period to generate duplicated data, wherein
the audio time setting unit sets a time in synchronization with a reproduction end time of the sound recorded in the detection period to an audio reproduction time of the duplicated data.

9. The image pickup device according to claim 6, further comprising:
a manual setting unit configured to set a fixed period as a manual setting period according to an operation by a user, wherein
the frame rate converting unit converts a frame rate of at least one of the plurality of frames imaged in a period other than the detection period and the manual setting period to the low frame rate, and
the audio reproduction time setting unit sets a specific time in the manual setting period as the audio reproduction time relative to sound recorded in the manual setting period.

10. The image pickup device according to claim 6, further comprising:
a sound superimposing unit configured to superimpose a predetermined additional sound on the sound.

11. An image processing method comprising:
detecting a frame at the time of a scene change from among a plurality of frames imaged at a predetermined frame rate as a detection frame;
converting a frame rate of at least one of the plurality of frames imaged outside a detection period of the detection frame to a low frame rate lower than the predetermined frame rate;
setting a reproduction time when reproduction is performed at the low frame rate as a video reproduction time of each of the plurality of frames; and
setting an audio reproduction time at constant intervals to a plurality of sounds recorded at the constant intervals outside the detection period and setting the audio reproduction time in synchronization with the video reproduction time for sound recorded in the detection period by an audio reproduction time setting unit.

12. The image processing method according to claim 11, further comprising:
decreasing a reproduction speed of the sound recorded in the detection period.

13. The image processing method according to claim 11, further comprising:
- duplicating data of the sound recorded in the detection period to generate duplicated data; and
- setting a time in synchronization with a reproduction end time of the sound recorded in the detection period to an audio reproduction time of the duplicated data.

14. The image processing method according to claim 11, further comprising:
- setting a fixed period as a manual setting period according to an operation by a user;
- converting a frame rate of at least one of the plurality of frames imaged in a period other than the detection period and the manual setting period to the low frame rate; and
- setting a specific time in the manual setting period as the audio reproduction time for sound recorded in the manual setting period.

15. The image processing method according to claim 11, further comprising:
- superimposing a predetermined additional sound on the sound.

16. A non-transitory computer readable medium storing program code executable by a computer to perform operations comprising:
- detecting a frame at the time of a scene change from among a plurality of frames imaged at a predetermined frame rate as a detection frame;
- converting a frame rate of at least one of the plurality of frames imaged outside a detection period of the detection frame to a low frame rate lower than the predetermined frame rat;
- setting a reproduction time when reproduction is performed at the low frame rate as a video reproduction time of each of the plurality of frames; and
- setting an audio reproduction time at constant intervals to a plurality of sounds recorded at the constant intervals outside the detection period and setting the audio reproduction time in synchronization with the video reproduction time for sound recorded in the detection period.

17. The computer readable medium according to claim 16, wherein the operations further comprise:
- decreasing a reproduction speed of the sound recorded in the detection period.

18. The computer readable medium according to claim 16, wherein the operations further comprise:
- duplicating data of the sound recorded in the detection period to generate duplicated data; and
- setting a time in synchronization with a reproduction end time of the sound recorded in the detection period to an audio reproduction time of the duplicated data.

19. The computer readable medium according to claim 16, wherein the operations further comprise:
- setting a fixed period as a manual setting period according to an operation by a user;
- converting a frame rate of at least one of the plurality of frames imaged in a period other than the detection period and the manual setting period to the low frame rate; and
- setting a specific time in the manual setting period as the audio reproduction time for sound recorded in the manual setting period.

20. The computer readable medium according to claim 16, wherein the operations further comprise comprising:
- superimposing a predetermined additional sound on the sound.

* * * * *